Nov. 28, 1950     A. E. HAGUE ET AL     2,531,622
AUTOMATIC ACCOUNTING DEVICE

Filed June 24, 1949     14 Sheets-Sheet 1

INVENTORS    A. E. HAGUE
                 A. E. JOEL, JR
BY
                     ATTORNEY

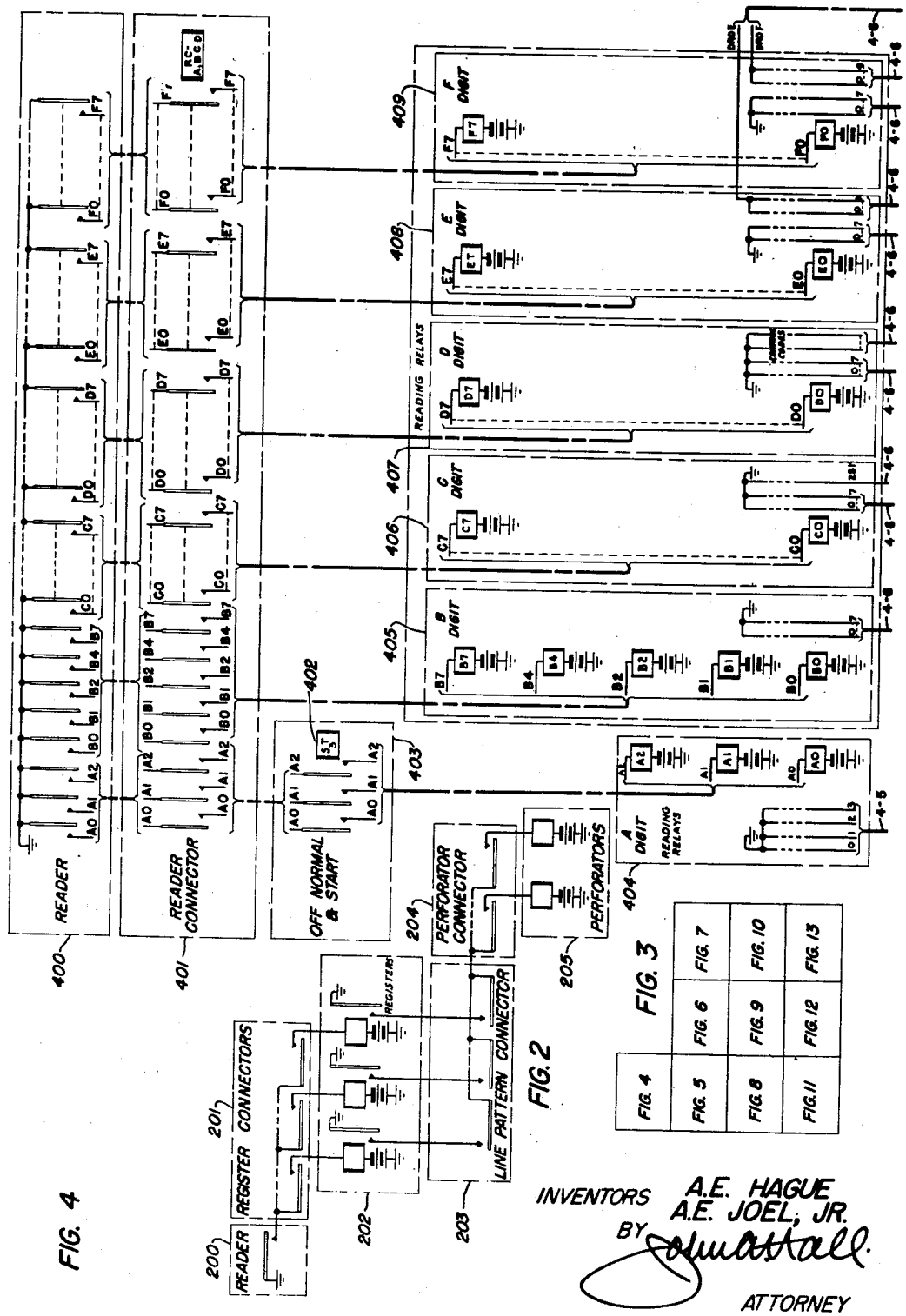

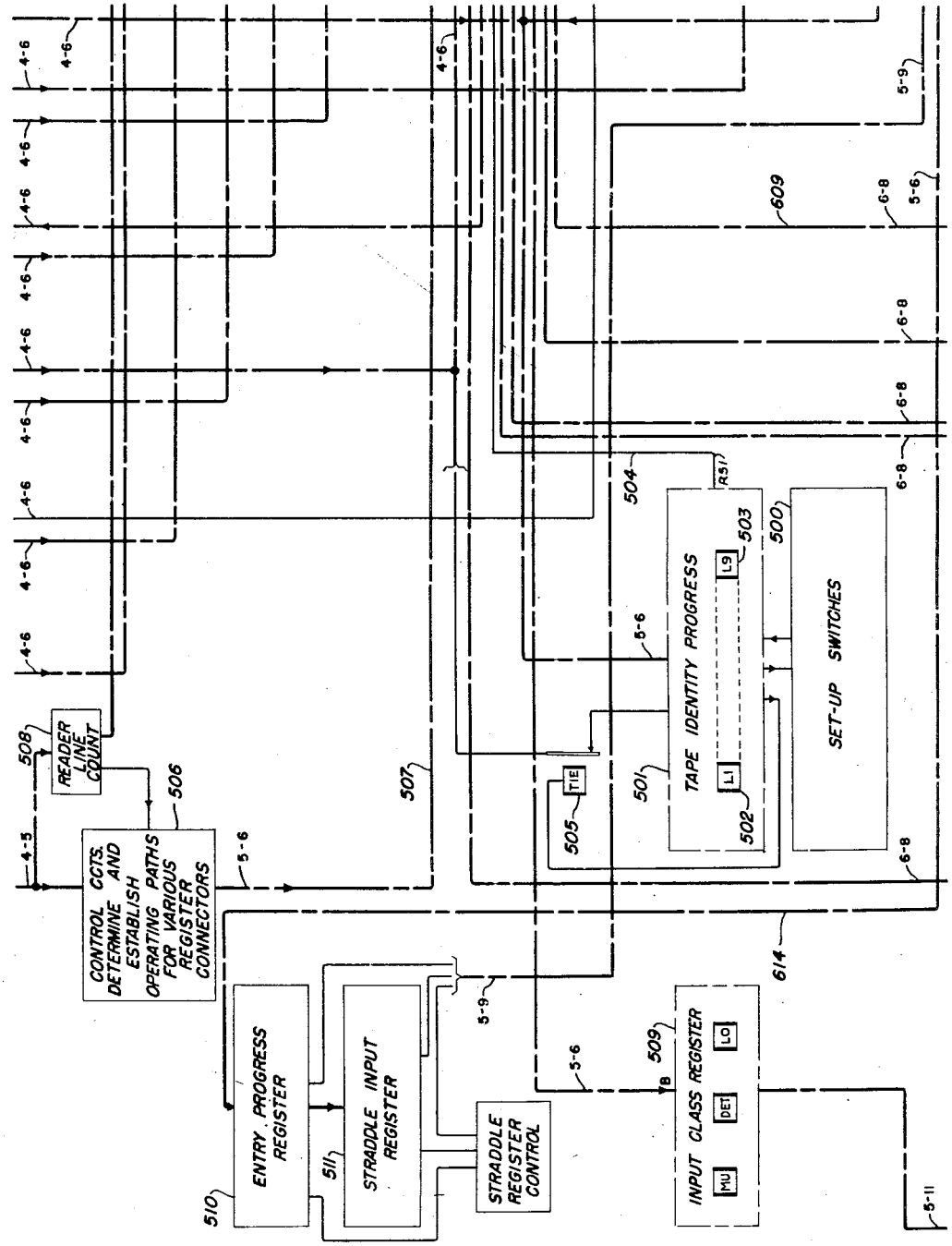

Nov. 28, 1950     A. E. HAGUE ET AL     2,531,622
AUTOMATIC ACCOUNTING DEVICE
Filed June 24, 1949     14 Sheets-Sheet 6

INVENTORS
A.E. HAGUE
A.E. JOEL, JR.
BY John A. Hall
ATTORNEY

INVENTORS A.E. HAGUE
A.E. JOEL, JR.
BY John A. Hall
ATTORNEY

Nov. 28, 1950     A. E. HAGUE ET AL     2,531,622
AUTOMATIC ACCOUNTING DEVICE

Filed June 24, 1949                14 Sheets-Sheet 10

INVENTORS   A.E. HAGUE
               A.E. JOEL, JR.
BY
          ATTORNEY

Nov. 28, 1950         A. E. HAGUE ET AL         2,531,622
                    AUTOMATIC ACCOUNTING DEVICE
Filed June 24, 1949                           14 Sheets-Sheet 12

INVENTORS  A. E. HAGUE
           A. E. JOEL, JR.
BY
                    ATTORNEY

INVENTORS A. E. HAGUE
A. E. JOEL, JR.
ATTORNEY

INVENTORS  A. E. HAGUE
A. E. JOEL, JR.
BY John A. Hall
ATTORNEY

Patented Nov. 28, 1950

2,531,622

UNITED STATES PATENT OFFICE 2,531,622

AUTOMATIC ACCOUNTING DEVICE

Alfred E. Hague, West Orange, N. J., and Amos E. Joel, Jr., New York, N. Y., assignors to Bell Telephone Laboratories, Incorporated, New York, N. Y., a corporation of New York Application June 24, 1949, Serial No. 101,090

3 Claims. (Cl. 235—61.7)

This invention relates to automatic accounting systems and particularly to systems wherein records automatically produced by and of customer uses of given facilities over variable time periods are processed by electrical devices in a number of steps to produce customer bills for the services rendered.

The object of the invention is to provide means for collecting the data from various and scattered sources in the records, to calculate the charges to be made and to translate the records into the form required for printing.

The present invention resides in a plurality of circuit details of one of the electrical devices employed for one step in the automatic accounting process, that device known as the computer. This device, like the other devices employed, is arranged to take records from an incoming or old perforated tape, to modify the records in accordance with the purposes for which it is adapted and to produce a plurality of outgoing or new perforated tapes therefrom.

The original tape, automatically produced by customer use of given facilities contains scattered items of specific information, such as the initial entry, the answer or start time and the disconnect or termination time for each customer use and other items of general information, such as the general location of the using customer's facilities, the date, the hours and the identity of the billing period. This tape in a specific arrangement of an accounting system is employed as an incoming tape in a device known as an assembler, which collects or assembles the various and scattered items of specific information.

The next step in the accounting process is performed in the computer which takes the assembled items of specific information, calculates therefrom elapsed time, modifies the result in accordance with a billing index which indicates the rate of charges, translates this result into a number of unit charges (message units in an automatic message accounting system) and distributes the calculated charges along with accompanying details to one or another of a plurality of outgoing tapes.

In a specific embodiment of the invention the computer is provided with a reader for entering data from an incoming tape into its calculator and registers and nineteen perforators for distributing the processed data to nineteen outgoing tapes. There will be ten of such perforators assigned to the recording of message unit charges. If the tape is from a marker group serving more than one office, then as many of these perforators as there are offices will be used so that a separate outgoing tape for each office will be prepared. If the marker group contains but a single office then the charges will be sorted on a decimal basis either in accordance with the thousands digit of the called line number or in accordance with the units digit thereof. There will be six of such perforators assigned to the recording of detail calls, that is calls, the details of which will be reported on the customers' bills. Since the central office tapes are recorded by "rounds" and since the longest round provided for will consist of six days, then six perforators are provided so that the detail calls may be sorted by days. There will be one perforator assigned to the recording of irregular calls such as straddle calls or those occasional calls which exceed the capacity of the device such as those extending over a period of time greater than ninety-nine minutes. There will be one perforator assigned to the recording of the details of message unit calls where these details are sought for monitoring or other purposes by the customer. The customer's bill will nevertheless be rendered on the message unit basis so that a particular message unit call will be processed by the computer and two records produced therefrom, one in short form on one of the regular message unit tapes for billing purposes and another in longer form on the message unit detail record tape for supervisory purposes. And lastly there will be one perforator assigned to record the line observed calls, that is, a record made of all calls originated on certain lines put under observation under routine or on account of customer complaints.

The first seventeen output tapes including the ten message unit tapes, the six detail call tapes and the irregular call tape will contain billing information whereas the last two, the message unit detail call and the line observed call tapes will contain reference information. The distribution of calls to these nineteen outgoing channels is a function of the computer and in most cases is controlled by some index in the initial entry of each call, but may in other cases be controlled by extraordinary conditions derived or detected by the computer itself, as when the elapsed time calculated exceeds two digits (99 minutes). Thus, the computer translates, calculates, computes, sorts and otherwise rearranges the items of information found on an incoming tape to form a plurality of outgoing tapes carrying the thus processed information in another form.

By way of illustration, a number of examples of assembled call information as they appear on the incoming tape and as they are transformed for perforation on one or another of the outgoing tapes are given with a short explanation of certain features of the transformation.

(1) A message unit call entered as:

135246
131746
213046
005444 which is a call made from office 0 of the given marker group (identified in the tape identity entries) from calling line 5444, and extending from 31.7 minutes to 35.2 minutes. The billing index (3), we will assume will cause the calculation of 3.5 minutes of elapsed time to indicate 2 message units, so that the computer will form and cause to be perforated on the number 5 perforator (thousands digit of calling line number, assuming a single office in the given marker group) the following output line:

125444

(2) A message unit call entered as:

135237
117537
214037
031234 which is a call from office 3 of the given marker group (identified in the tape identity entries) from calling line 1234 and extending from 17.5 minutes to 35.2 minutes. The billing index (4) we will assume will cause the calculation of 18.7 minutes of elapsed time to indicate 12 message units so that the computer will form and cause to be perforated on the number 3 perforator (sorted by office when the marker group contains more than one office) two output lines;

201234
000012

(3) A message unit call entered as:

101673
281021
156273
213073
005444 is one very similar to Example No. 1 except that it also includes an hour entry. The elapsed time is calculated as follows:

+01.6
+60.0
−56.2
―――
+ 5.4

If this in combination with the billing index indicates 3 message unit calls then the output will be:

135444

(4) A message unit call might appear as:

101652
281899
156252
213052
005444

The second line in this case is known as an irregular hour entry and while it does not show the actual hour it nevertheless sets the hour circuit back an hour so that the calculation is identical with Example No. 3 and the output line will be:

135444

(5) Should a call appear as follows:

101657
281021
281020
156257
213057
005444 then the calculation of elapsed time would be as follows:

+ 01.6
+120.0
− 56.2
―――
+ 65.4

Assuming that this elapsed time will indicate 27 message units, the output becomes:

235444
000027

(6) If the line 5444 of Example No. 1 were under observation, then the input to the computer would be as follows:

135246
131746
243046
005444
051133
010000

The entry index (the B digit of the first line of the initial entry) is 4 instead of 1 as in the first example, and two supplementary lines giving details of the called number are added. In this case the computer forms and causes to be perforated on the number 5 perforator, as before, the output line:

125444

This is billing information and will eventually be the data from which the customer's bill is made up.

In addition the computer forms and causes to be perforated on the line observation tape the following:

105444
062511
051133
010000
000402

This is supervisory information and is not used in forming bills but goes to company officials for various purposes such as routine checking, or for answering complaints, etc. The second line is formed by a translator from an assumed date (15th), hour (21) and answer time (31). The third and fourth lines are copies of the last two lines of the assembled call and the last line has a record of the message unit index (0), the chargeable time (04—rounded off from 3.5) and the number of message units charged (02).

(7) In Example No. 6 if the third line had been 233046 instead of 243046 then a message unit detail call is indicated. In such case the output line will be 125444 as before and the five-line detail information record will be exactly the same except that it will be perforated on the MUD tape instead of the LO tape and will eventually go to the customer for his information.

(8) A detail call read from the incoming tape as:

```
135213
131713
239013
005444
051133
010000
``` will be processed and distributed to the detail call output tape as:

```
105444
062511
051133
010000
000400
```

The first line of this output gives the calling line number. The second line is the start time line which is synthesized from the day (15), the hour (21) and minutes (31). The third and fourth lines are copies of the last two lines of the call as entered and the last line shows the chargeable time as 04 minutes. Note the difference between this and Example No. 6 where the number of message units (02) appeared as the last two digits of the last line. In the present case the message billing index (9) in the third line 239013 of the entries read from the incoming tape is a means which causes the last two digits of the last line of the processed call perforated on the detail call tape to be blanked out as 00.

(9) With a very slight difference, the digit 4 instead of the digit 3 as the B (or second) digit of the first line of the initial entry as:

```
135213
131713
249013
005444
051133
010000
``` the following record:

```
105444
062511
051133
010000
000400
``` will be perforated in both the line observing output tape and the detail call tape.

There are many variations of the above described patterns to take care of many operating contingencies and which need not be described in detail. One of the important circuits of the computer but which in fact gets less use than others is the so-called straddle circuit for taking care of a variety of irregular calls and which are mainly recorded so that an operator or clerk may investigate the irregular circumstances and prepare a bill by hand.

In general, the computer consists of a plurality of registers into which both items of specific information and items of general information may be entered, a calculator, steering means, line forming pattern means and distributing means. Specific details of a call are entered, the elapsed time is calculated and this is weighted, rounded off and converted into charges, either chargeable time or a number of message units.

Again, generally the first items of information entered in the computer are the recorder number, the hour and the day and these are registered before any specific problem is presented for calculation and remain registered until a complete group (for a single call identity index) of calls has been processed. During the processing of this group the hour and the day registrations are changed from time to time by the occurrence of an hour entry found among the scattered items of specific information.

The first of the specific items of information to be registered are the two items fixing the start and end of the customer use of the facilities and from these the calculator derives the elapsed time and transmits this to an elapsed time register where it is held under control of an output control circuit. Generally, the elapsed time may be calculated and registered before the initial entry giving other details of the customer use can be completely registered and the output lines formed and transmitted. To save time, an overlapping arrangement is employed, whereby after a calculation has been made and the elapsed time has been transferred to the elapsed time register but before the computer has transmitted the patterned lines to an output tape, the time element lines of the next call are entered in the calculator.

After the complete information has been registered in the computer the output control will cause the selection of a particular output channel and will transmit thereto the patterned lines such as those explained hereinabove.

A feature of the invention is a control circuit whereby upon the receipt of a given item of information, not only is this information properly registered for normal use thereafter but the same information is used for priming purposes to alert another circuit and make it ready to intervene in the normal operations to immediately take over control to divert the output of the computer to the channel for reporting irregularities should an irregularity appear. In a specific embodiment of the invention it will appear that if in the original gathering of the data recording the various customer charges, when for some reason a regularly employed recorder becomes incapacitated or is taken out of service and an emergency recorder substituted therefore, certain time delays are introduced in the records made which might cast doubt on the validity of the charges and it is, therefore, important that a change in recorders, from a regular recorder to an emergency recorder or vice versa be separately reported so that the records may be critically examined by the personnel of the business office. Preceding every section of tape containing customer charge data, there will be items of general information, including the recorder number, the hour and the day. In this particular case, when the recorder number is registered, the straddle circuit is also primed, that is, a preliminary signal is transmitted which will alert the straddle circuit to immediately seize control if and when an item of information is encountered indicating that there has been a change in recorders.

There are several conditions which are to be met. When, for instance, the recorder number register is not occupied, that is, on the first occurrence of a recorder number code and before there has been such a preliminary signal, the recorder number code is transmitted through a normally released preliminary signal relay to operate another relay whose function is to watch for a change in recorder number and this relay will thereupon operate the preliminary signal relay to alert the straddle circuit. Thereafter, if no change in recorder number occurs then the (RC) recorder change relay is released but the preliminary signal remains locked in to hold the straddle circuit in readiness until the complete data for the first change has been received and it is certain that no recorder change has been effected during the recording of such data.

Under normal operating conditions thereafter, when a recorder number code is encountered, the recorder number is first compared to the number which has previously been registered and if there has been no change then the operations continue without interruption. However, if the number differs from that registered, then, the (C) change relay operates to show that a change has occurred and this again causes the (RC) recorder change relay to operate and to go through the same operations above set forth.

There is another condition which may be met, a condition where through a mutilated code or otherwise the recorder number is missing. In this case if some other item of information which should normally follow the recorder number is offered for registration, then the (RCM) recorder number missing relay is operated and this will halt the operation of the device and bring in an alarm. The attendant finding that a recorder number is missing has at his disposal a key known as the recorder reset key by means of which a fictitious number may be placed in the recorder number register and this key will again close the circuit for operating the (RC) recorder change relay. Thereupon, the operations above set forth will take place, that is, the preliminary signal relay will operate and at the end of the reader cycle will release the recorder change relay and on the next cycle will allow the fictitious number to be registered. At the end of the registration of the complete data for a charge, when it is certain that no other recorder number code has been encountered within this period the preliminary signal is erased and normal operations take place until a recorder number code is again encountered.

If while the (PE) preliminary signal relay is operated a recorder number code is encountered, then the straddle circuit immediately comes into operation and the complete data is then recorded on the straddle tape so that the charges may be calculated by the business office personnel.

A feature of the invention may, therefore, be stated as a means for alerting a straddle or supervisory circuit whenever circumstances arise which indicate that doubt may be cast on the validity of the charges calculated for any one customer use of the facilities at his disposal.

Stated otherwise, this feature of the invention resides in the means for insuring that an item of general information which forms part of the essential charge data for the calculation of a customer charge remains constant throughout the gathering of the data for any one customer charge and the provision of means responsive to a change in this information within this period for diverting all data for this charge to a special channel which will report the complete data for special treatment.

The drawings consist of fourteen sheets having seventeen figures as follows:

Fig. 2 is a highly schematic showing of the basic switching circuit employed herein;

Fig. 3 is a block diagram showing how Figs. 4 to 13, inclusive, may be placed to form a more detailed but yet a schematic-like use of the elements of the present invention and in which;

Fig. 4 shows the reader and the reading relays by which the input tape is scanned;

Figure 6:
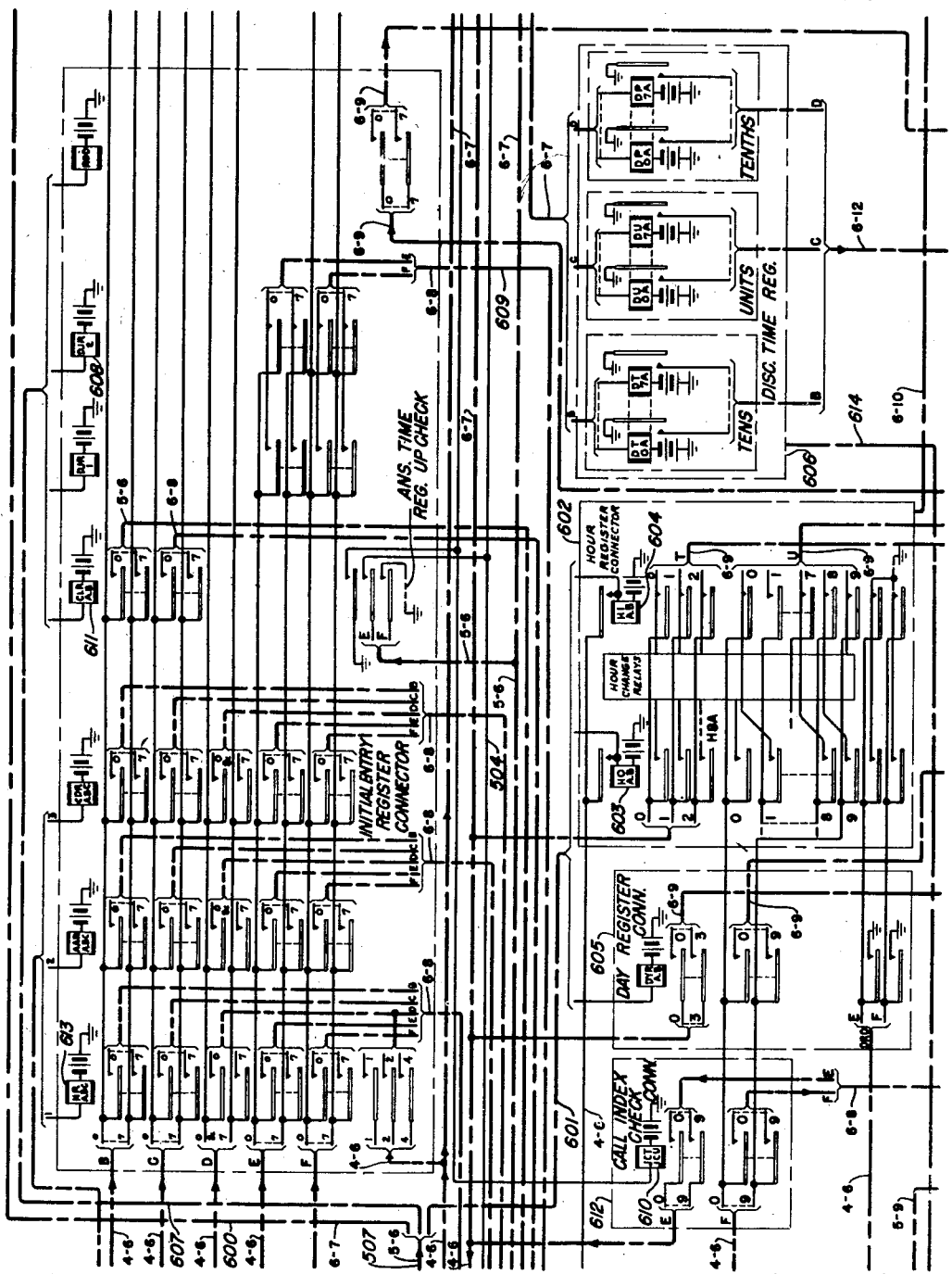
Figure 7:
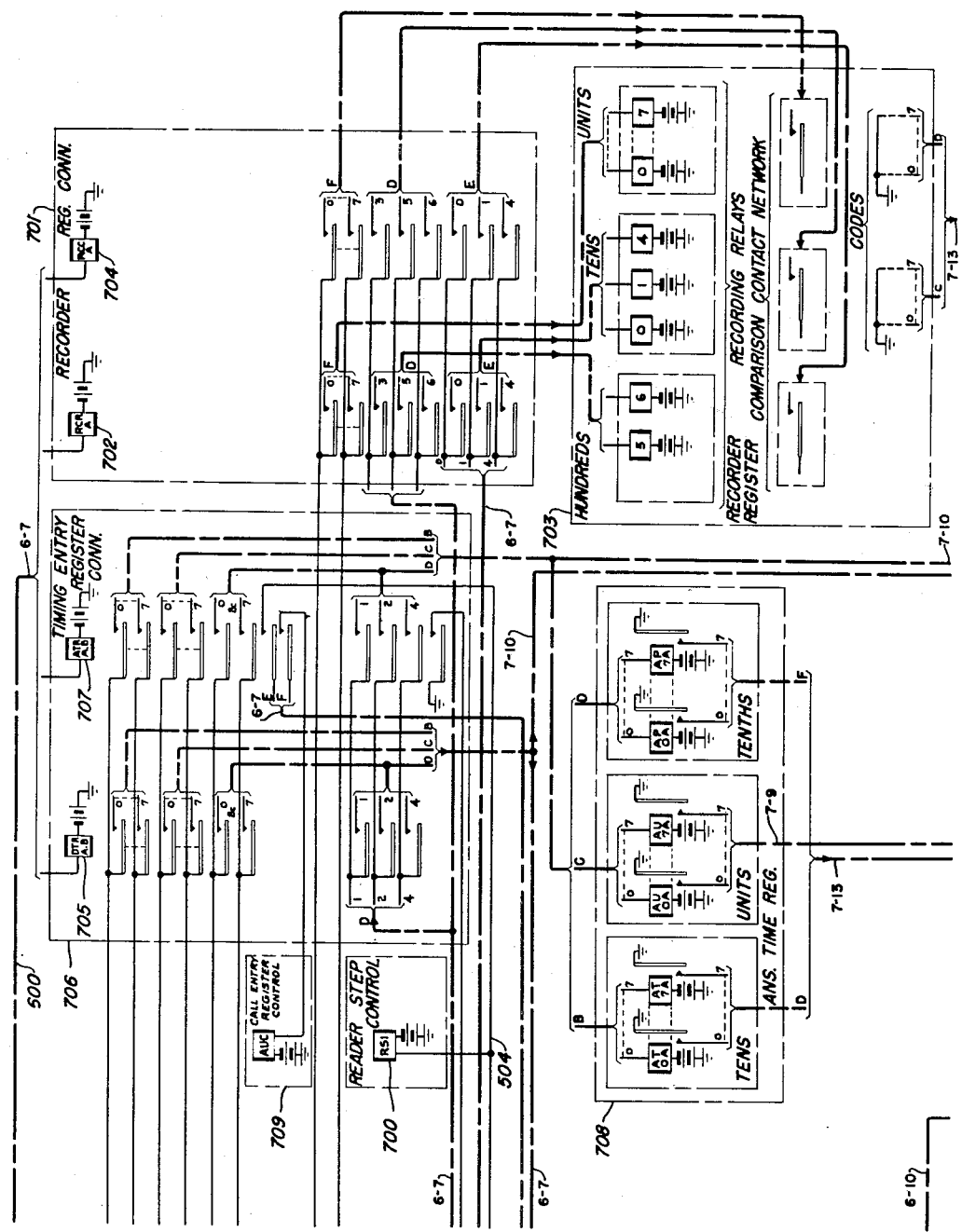
Figure 8:
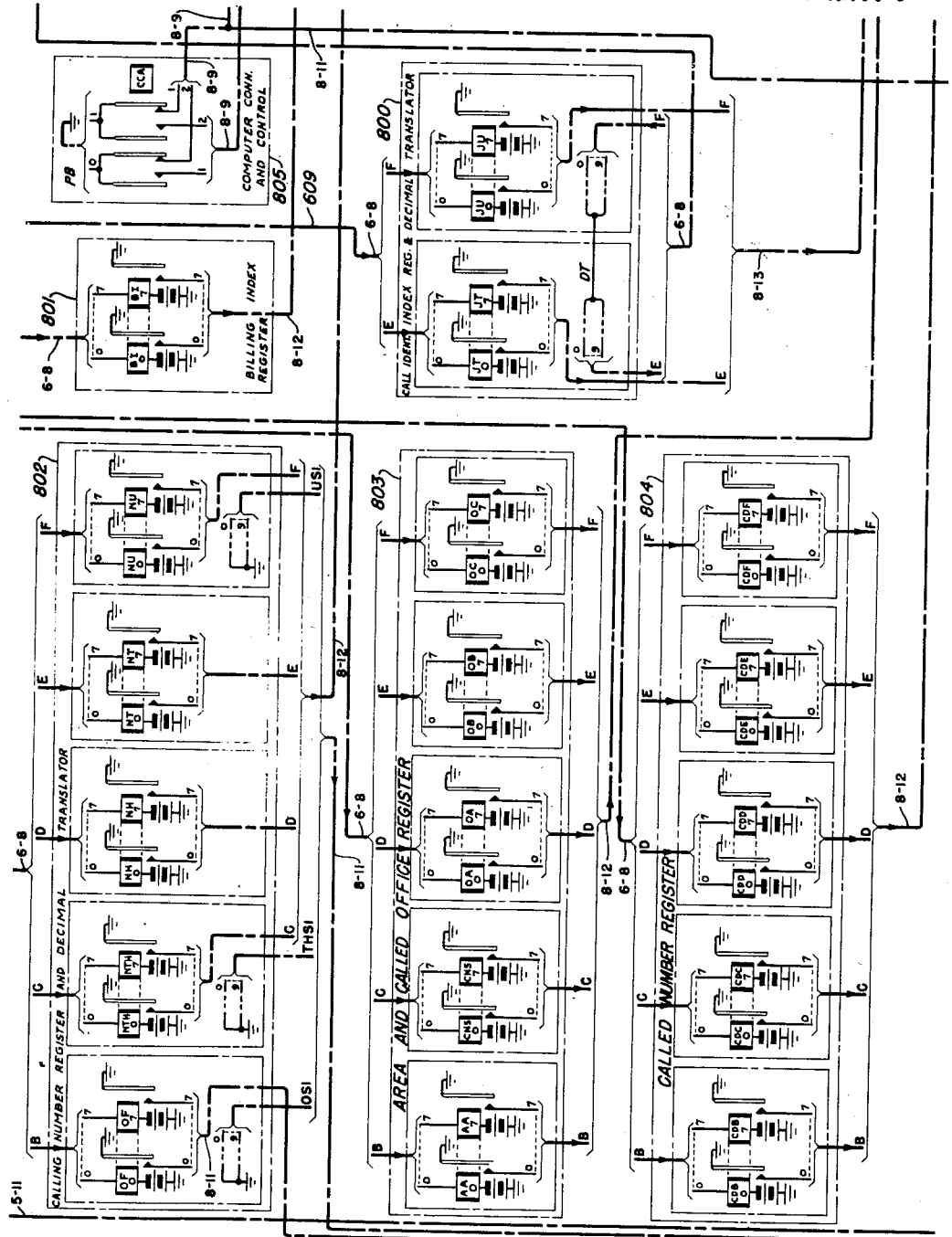
Figure 9:
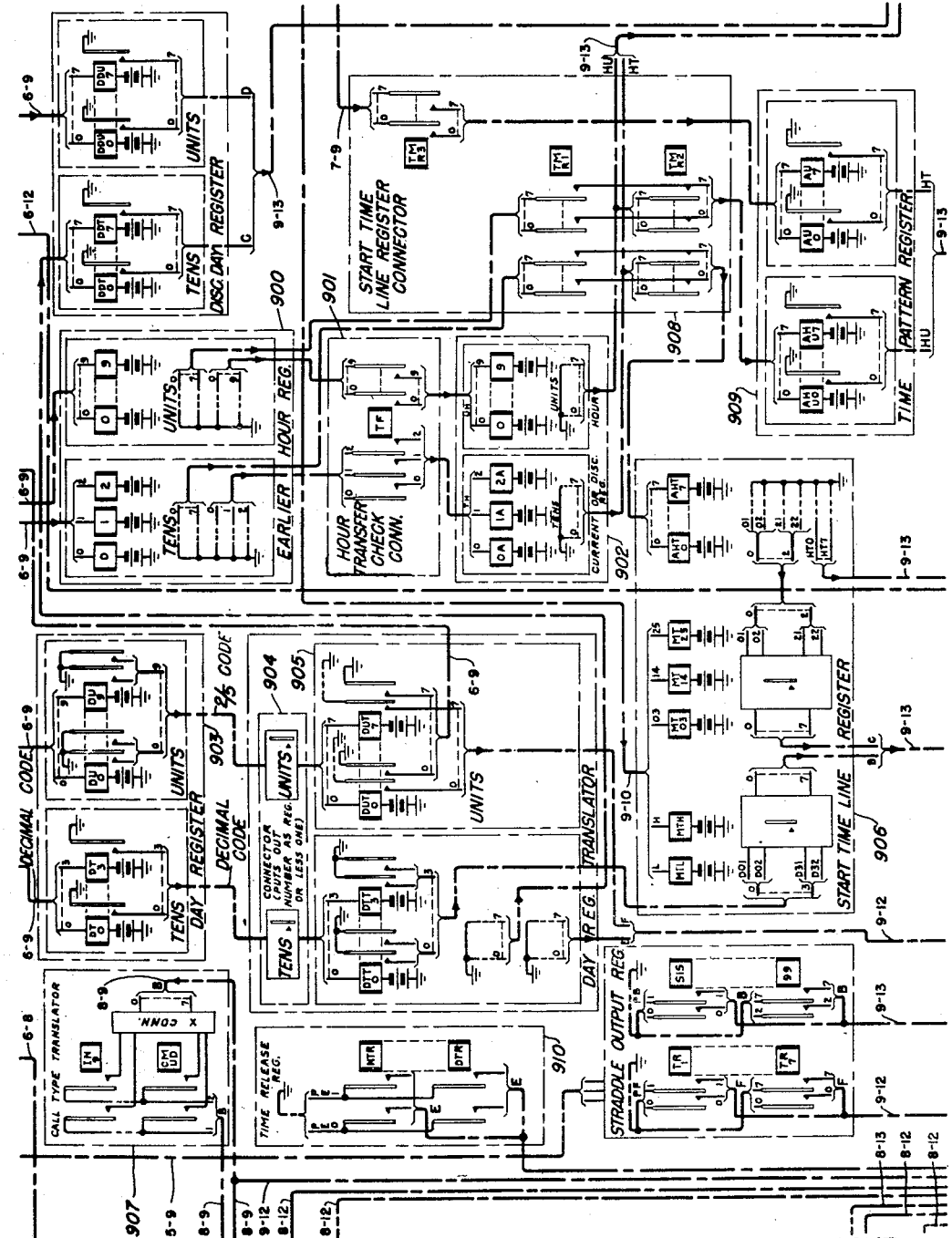
Figure 10:
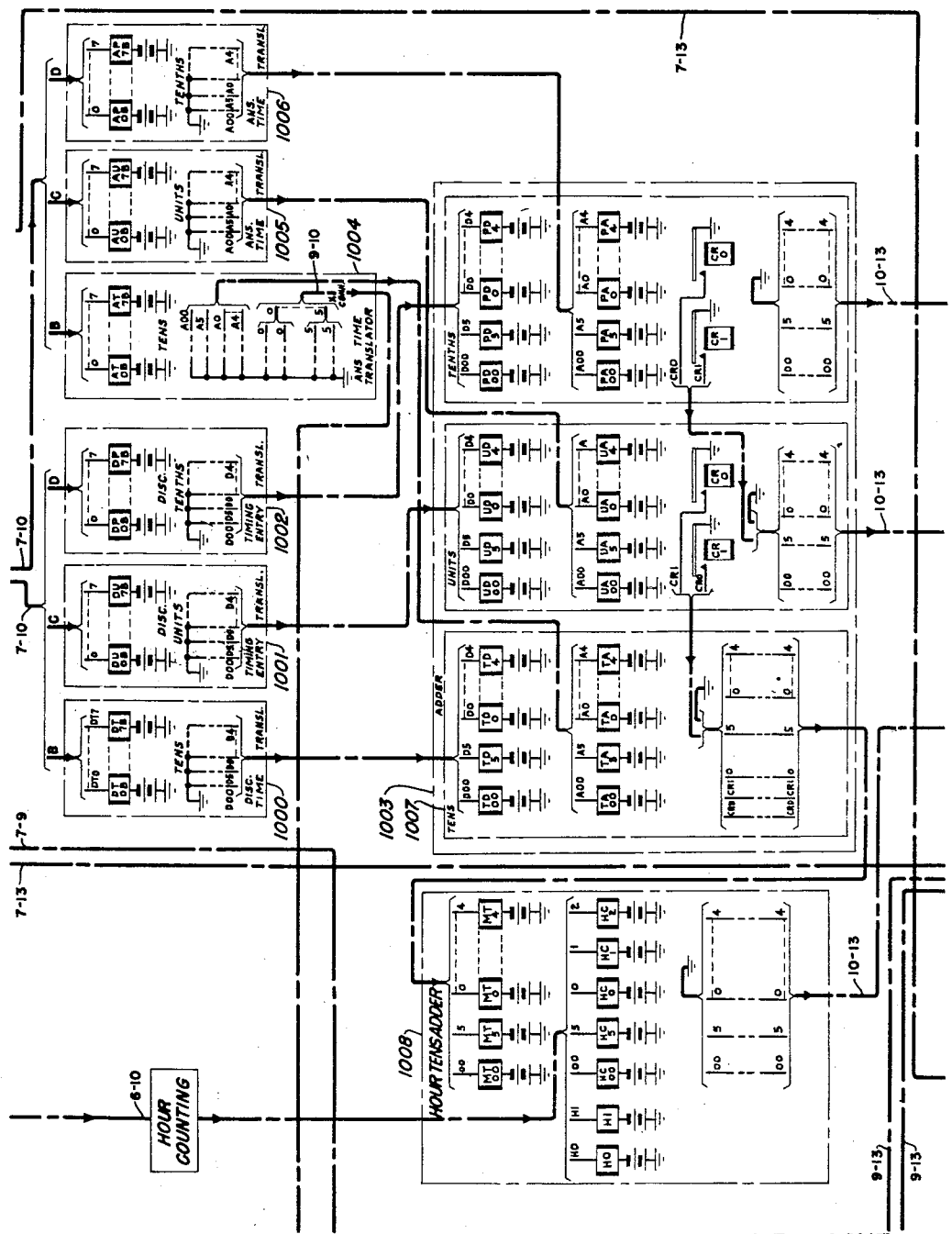
Figure 11:
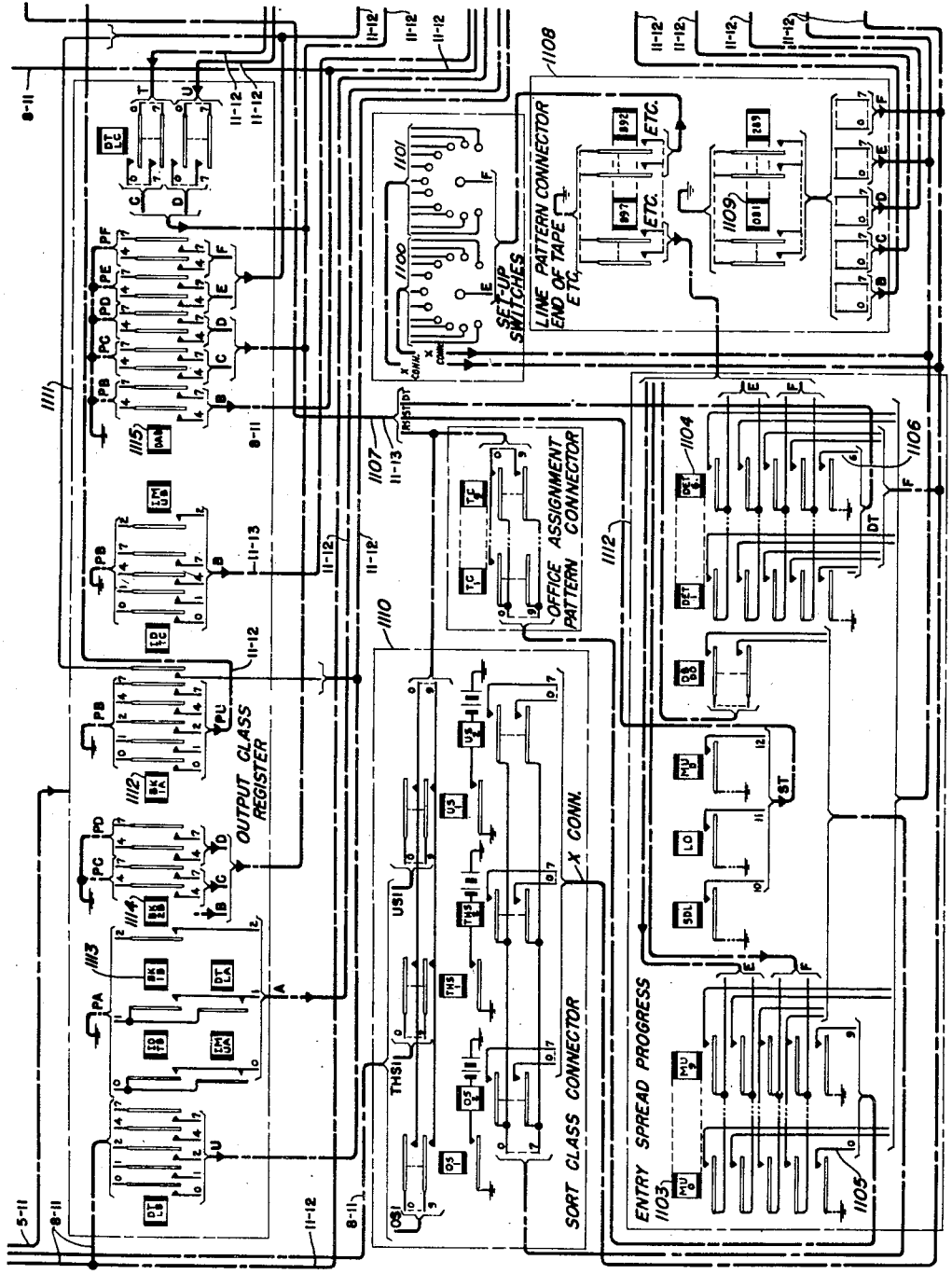
Figure 12:
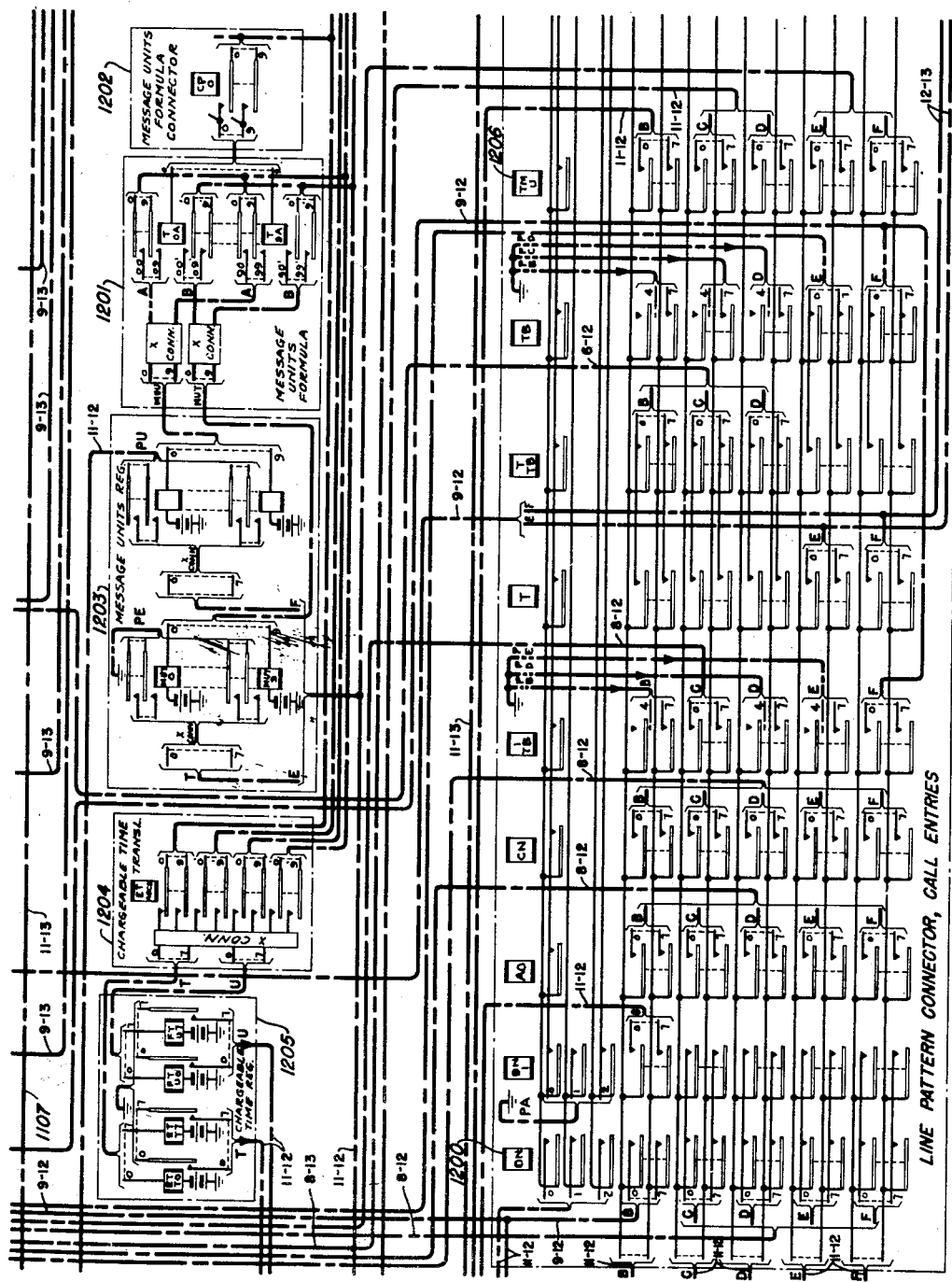
Figure 13:
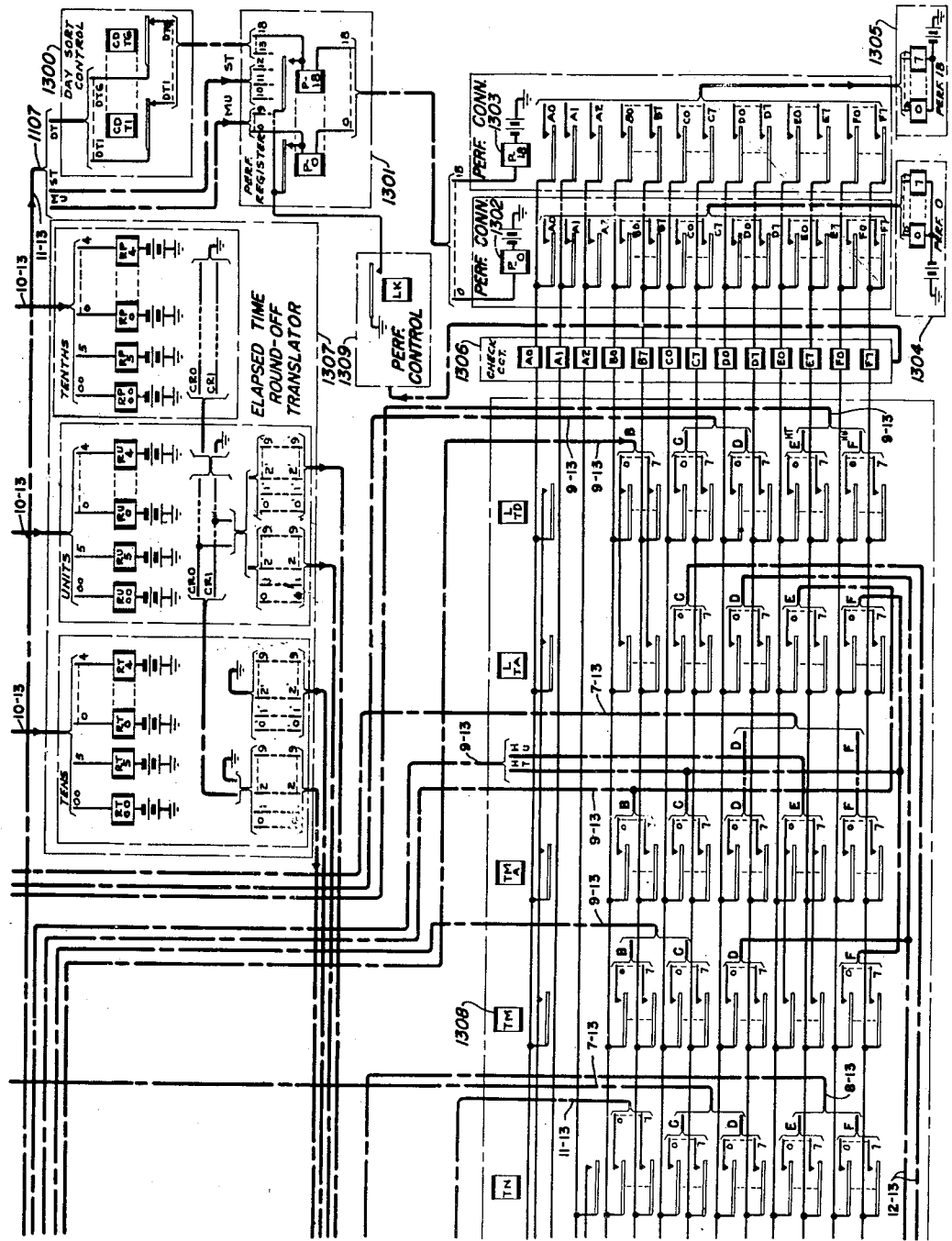
Figure 16:
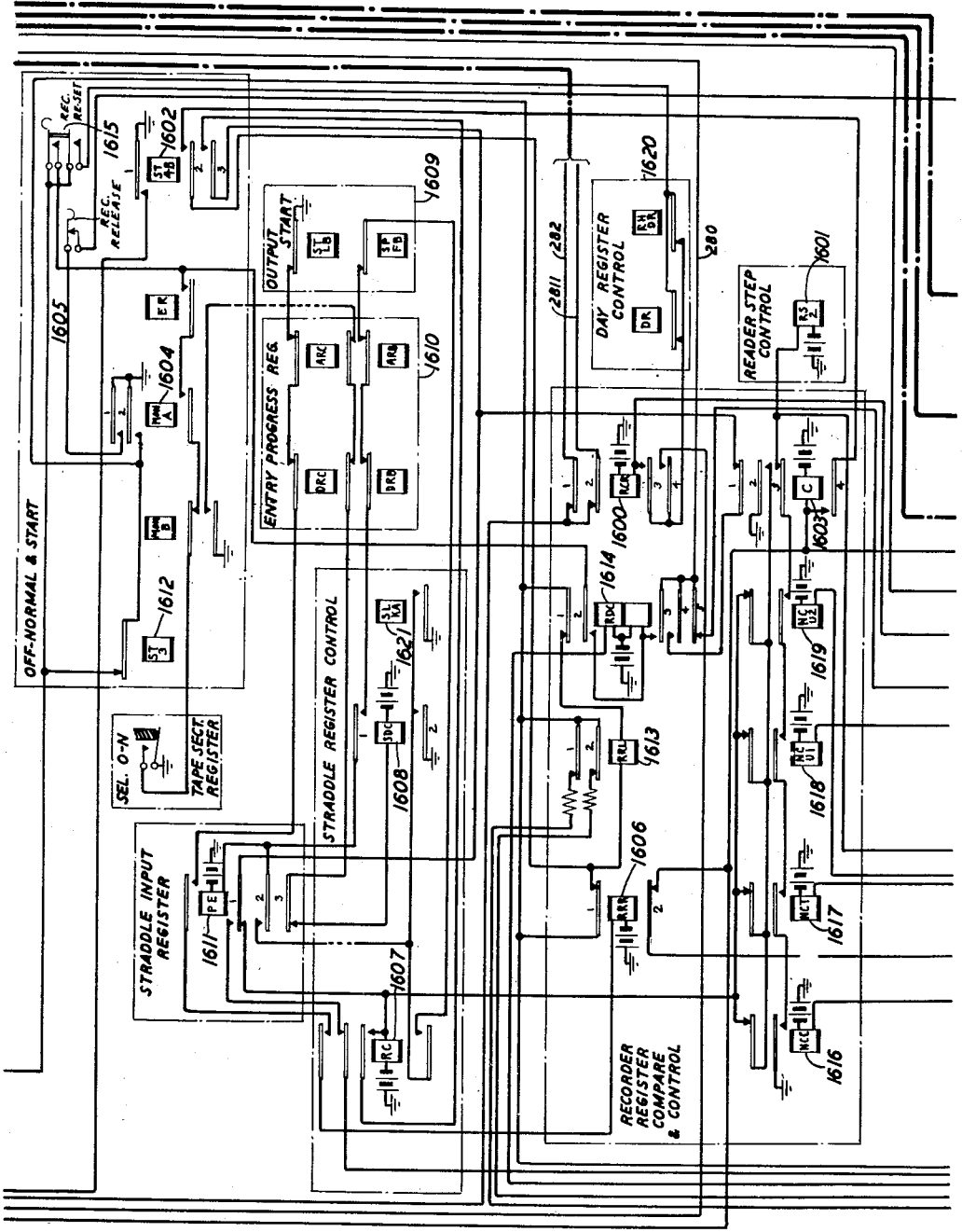
Figure 17:
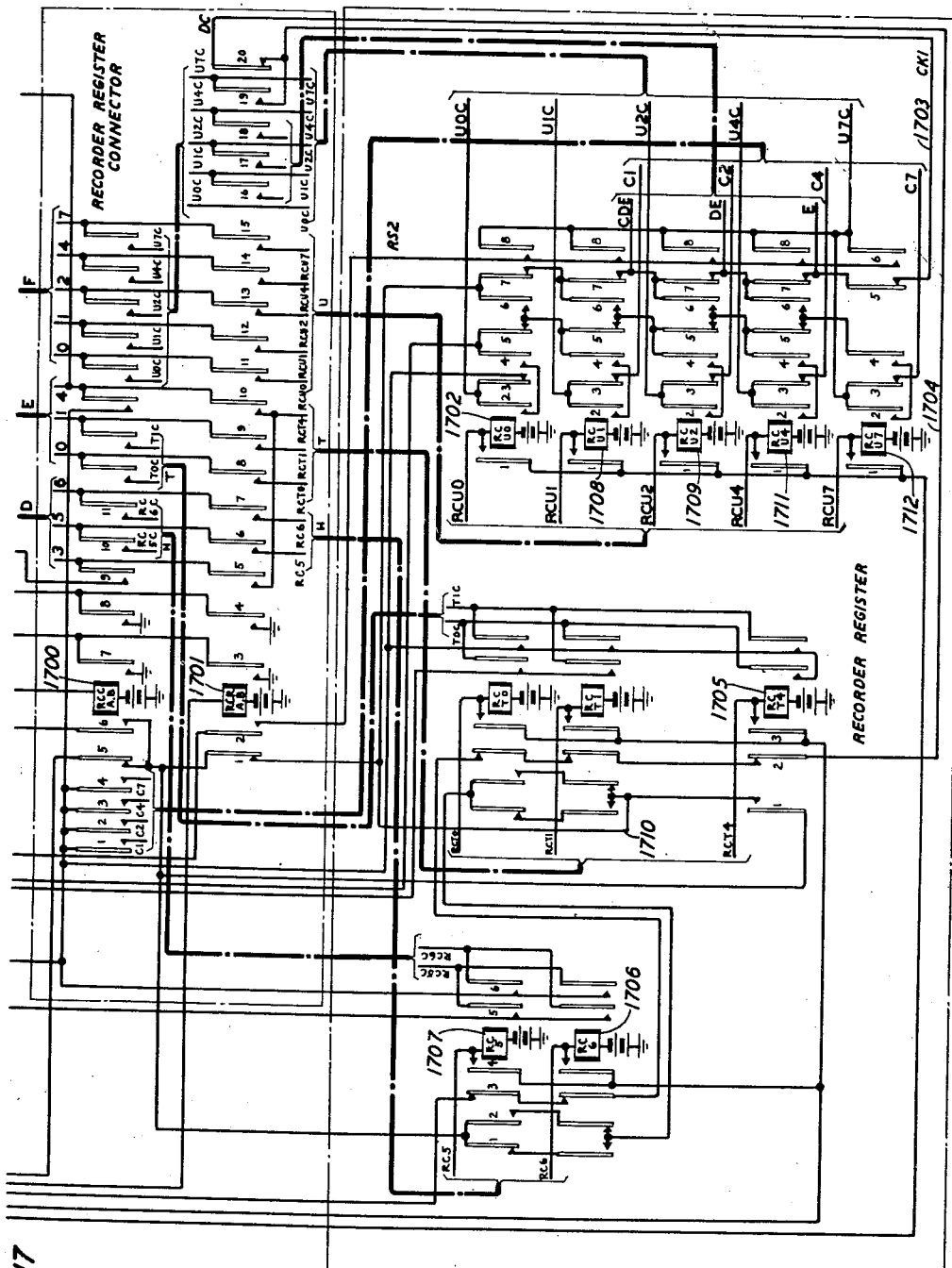

Fig. 5 indicates the location in the circuit arrangement of the reader line count means, the reading relay translator and the control circuits;

Fig. 6 shows a number of register connectors and indicates the disconnect time register;

Fig. 7 likewise shows a number of register connectors and indicates the answer time and the recorder register;

Fig. 8 shows the calling number register, the area and called office register, the called number register, the billing index register and the day and junctor register and decimal translator;

Fig. 9 shows the call type translator, the day register, the time release register, the day register translator, the straddle output register, the start time line register, the earlier hour register, the hour transfer check connector, the disconnect register, the disconnect day register, the start time line register connector and the time pattern register;

Fig. 10 shows the adder, that part of the computer which performs the mathematical functions thereof;

Fig. 11 shows the output class register, the sort class connector, the entry spread progress circuit, the office assignment pattern connector, the setup switches and the line pattern connector for the end of tape perforaton;

Fig. 12 shows the chargeable time register, the chargeable time translator, the message units register, the message units formula device, the message units formula connector and the line pattern connector for call entries; and Fig. 13 shows the elapsed time translator, the day sort control, the perforator register, the perforator control, part of the line pattern connector for call entries, the check circuit therefor and indicates two of a plurality of perforator connectors and the associated perforators;

Fig. 14 is a block diagram showing how Figs. 15, 16 and 17 may be placed to form a complete schematic diagram illustrating the characteristic feature of the present invention;

Fig. 15 shows the reading relays, part of the alarm circuit and certain auxiliary control circuits;

Fig. 16 shows the particular control circuit with which we are at present concerned; and Fig. 17 shows the recorder register, the recorder register compare circuit and the recorder register connector circuit.

In the following description the various relays are designated by both letters and numerals which have come to have certain significance to persons familiar with the technical details of the disclosed arrangements. By way of example, the reading relays are known as A0, A1 and A2 relays for the first group thereof used to register the A digit of the six-digit line used in the automatic accounting system tapes. In the present case, there are three relays in the first or A set and five relays such as the B0, B1, B2, B4 and B7 relays in each of the remaining five sets. In a great many cases a relay will have only such an alphabetic designation but in other cases it will have in addition a numerical designation which always consists of the figure number plus two other digits, whereby the location of a piece of apparatus can be at once found by turning to the corresponding figure number. Where conductors are designated by numerals in addition to the usual alphabetic designation thereof the number used will be a combination including the figure number wherein the conductor is first picked up in the tracing of a circuit and this number will be retained even though the conductors extend through another large number of circuits. Another convention used herein for the sake of clarity is a numbering scheme for the cables or bundles of conductors which must be carried over long distances. This is the use of a hyphenated number such as 29—118 indicating that this cable or bundle of conductors extends between Fig. 29 and Fig. 118.

For obvious purposes, in certain cases, conductors will bear the same alphabetic designation as other apparatus. This is not to be taken as a duplication of the designation but will be readily understood that such a conductor bears an intimate relation to the other piece of apparatus.

Similar logical means for designating various elements of the circuits will be found in the drawings and are used as an aid to the clear understanding of the present arrangement.

The apparatus used in constructing the device of the present invention is mostly standard communication apparatus, details of which may be found in the following references:

The relays are of types shown in patents:

1,156,671, E. B. Craft, Oct. 12, 1915
1,633,576, C. H. Franks, June 28, 1927
1,652,489, E. D. Mead, Dec. 13, 1927
1,652,490, D. D. Miller, Dec. 13, 1927
1,652,491, D. D. Miller, Dec. 13, 1927
2,169,551, C. I. Baker, Aug. 15, 1939
2,178,656, P. W. Swenson, Nov. 7, 1939
2,323,961, F. A. Zupa, July 13, 1943

The reader is disclosed in application Serial No. 666,280, May 1, 1946, W. W. Carpenter.

Other apparatus is of conventional design.

This application is one of a group of applications all disclosing features of the same device. The Joel application contains a full and complete description of all the circuit details, as well as a short description of several of the features thereof, while the remaining applications, including the present, of this group each contain short descriptions of several other features of the device and each relies upon the said Joel application for the full and complete description of the circuit details of the device as a whole. The complete disclosure of the device of the present invention will, therefore, be found in the present and the following applications:

| Serial No. | Filing Date | Inventor |
| --- | --- | --- |
| 101,087 | June 24, 1949 | A. E. Joel, Jr. |
| 101,088 | June 24, 1949 | Joel-Rippere |
| 101,084 | June 24, 1949 | Flint-Hague-Joel-Rippere |
| 101,085 | June 24, 1949 | Flint-Joel |
| 101,089 | June 24, 1949 | A. E. Hague |
| 101,083 | June 24, 1949 | E. W. Flint |
| 101,086 | June 24, 1949 | R. O. Rippere |
| 101,082 | June 24, 1949 | Eppel-Joel |

Other applications covering parts of the same development having disclosures overlapping the present disclosure in certain respects but covering independent inventions, as claimed therein, are as follows:

| Serial No. | Filing Date | Inventor |
| --- | --- | --- |
| 101,081 | June 24, 1949 | S. L. Eppel |
| 38,927 | July 15, 1948 | J. W. Gooderham |
| 788,449 | Nov. 28, 1947 | W. W. Carpenter |

Other applications having some relation to the present disclosure in that such applications show details of the complete development of which the present is but a part are as follows:

| Serial No. | Filing Date | Inventor |
| --- | --- | --- |
| 724,992 | Jan. 29, 1947 | Carpenter-Gooderham |
| 759,402 | July 7, 1947 | Carpenter-Collis |
| 793,298 | Dec. 22, 1947 | Joel-King |

It may be noted that the Joel-King application above discloses the over-all plan of the automatic accounting system of which the present application is a part.

General appearance

Figure 1:
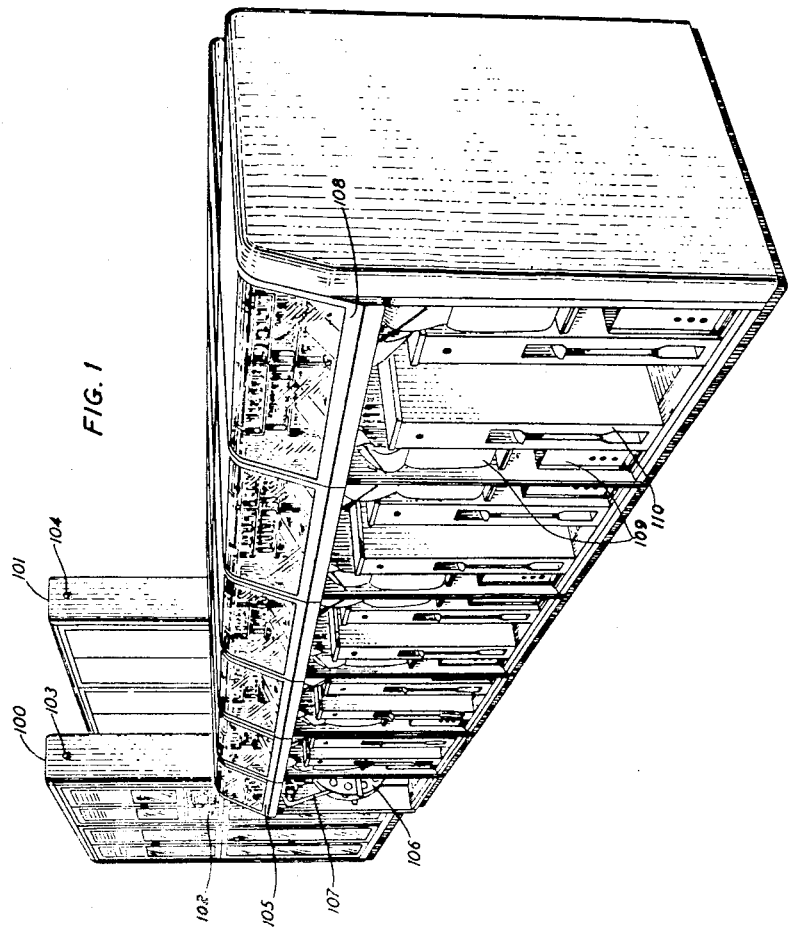
Fig. 1 is a perspective view of the racks and cabinets in which the device of the present invention is housed and is intended to give a general view of the device.

The general appearance of one embodiment of the invention is given in the perspective view in Fig. 1. There are two cabinets 100 and 101 in which the relays and other small apparatus are mounted. The key and lamp panels are indicated at 102 and contain the set-up switches, the various lamps and the keys used in investigating the condition of the computer at any time, particularly after an alarm has been brought in. Two main alarm lamps 103 and 104 are indicated as being mounted near the top of the relay cabinets and are in such a position that they can be seen from any part of the large room in which this piece of apparatus is mounted along with similar appearing apparatus for the assembler, the sorter, the summarizer and the printer. Shown in this view, there are six cabinets of which the first one 105 houses the reader. A reel 106 below the reader holds a long length of tape such as 107 which feeds into the reader above and after being processed is returned to and wound on another reel. Each of the other cabinets such as the right-hand end one 108 houses a pair of perforators. In each of these cabinets there is mounted a bin such as 109 containing a long length of unperforated tape which after being processed by the perforator is fed into another bin 110. The computer may contain as many as nineteen perforators as will be explained hereinafter and each customer charge as it is computed is sorted by being selectively perforated on one or another of the various output tapes.

General operation

Fig. 2 is what might be termed a thumb-nail sketch to explain the organization of the device forming the subject-matter of the present invention. It consists of a reader 200 for reading the perforations on an incoming tape representing items of information comprising the gathered and assembled data for customer or subscriber charges. As the various codes are sensed by the reader they are then distributed by means of the register connectors 201 to registers 202. The registers here represent a temporary holding means for the information, part of which is used for calculating purposes or for internal rearrangement and is reregistered and part of which is retained in its original form before being routed to output tapes. At any rate a selecting means, here shown as the line pattern connector 203 is employed to glean from the registers selected bits and items of information and then through another distributing arrangement, the perforator connector 204 to route the computed charge data to the various perforators 205 whereby a plurality of output tapes are formed.

There are two communication channels, or trunks, one to transmit the incoming data from the reader to the registers and the other to transmit the outgoing data from the registers to the tape perforators. The registers form the heart of the device, for it is within this arrangement that the information is processed and held ready for the output circuit to make its selection and its records.

This Fig. 2 will then be regarded as a backbone or skeleton for the more elaborate schematic shown in Figs. 4 to 13, here arranged as shown in Fig. 3.

In this general schematic of the system, the input or reading means in shown in Fig. 4. This consists of a reader 400, a device essentially for the sensing of the twenty-eight code perforations in the automatic accounting system tape, incoming to this unit of the system and which had been produced as an output tape by the assembler. The reader consists of an assemblage of twenty-eight pins which seek to pierce the holes perforated in corresponding positions of the tape, those which succeed, signaling the achievement by connecting ground to a corresponding conductor and those whose path is blocked by unperforated tape holding their corresponding conductors open.

The twenty-eight conductors connected to the twenty-eight reader pins pass through the contacts of the reader connector 401 by means of which they may be connected as determined by the control circuits to the reading relays. In the case of the first three of these conductors representing the code for the first or A digit, an additional break is placed in the path of these conductors consisting of the make contacts of the ST3 start relay 402 in the off-normal and start circuit 403 so that the A digit codes cannot operate the A digit reading relays until the device has been properly started and is in satisfactory operation.

The coded grounds are thus extended to and operate the reading relays during the reading interval and so far as the registers into which the codes are read merely act to relay the ground signals from the reader. However, the reader closes but a single path whereas each reading relay controls a plurality of contact sets whereby the validity of a code may be tested and various other control circuits may be closed whereby the item of information contained in a code being read by the reader not only may be forwarded to a register but a part of the code may be used for control and other operations.

As clearly indicated in Fig. 4, the twenty-eight places of the code are allotted three for the first or A digit and five for each of the following five B, C, D, E and F digits. The A digit reading relays 404 consist of the A0, A1 and A2 relays and are used to index the line read and to thus classify the information contained in the other five digits.

By way of example, a zero in the A digit, signaled by the operation of the A0 relay, may be a splice code or a supplementary line of an initial entry, a 1 in the A digit is a timing entry such as the disconnect or the answer time, the 2 in the A digit may be the first line of an initial entry, one of the tape identity codes or some special code and lastly a 3, signaled by the simultaneous operation of all three A0, A1 and A2 relays may be a special code such as a timed release at the disconnect time.

Each of the remaining five-digit groups of reading relays such as the B digit group 405 have five relays designated 0, 1, 2, 4 and 7 and are known as a two-out-of-five group, since the code to express any one of the ten digits consists of the energization of two out of the five available relays in such a combination that the sum of their designations equals the digit expressed. An exception to this general rule is that the operation of the 4 and the 7 relays expresses the digit 0.

The splice code 081010 is then expressed by the operation of the A0 relay in the A digit group 404, the B1 and B7 relays in the B digit group 405, the C0 and C1 relays in the C digit group 406, the D4 and D7 relays in the D digit group 407, the E0 and E1 relays in the E digit group 408 and the F4 and F7 relays in the F digit group 409. Other codes are expressed in like manner.

The tape identity codes are those which have the same first three digits 289 and count from 2891XX to 2899XX so that in this case the 289 is used for certain control purposes, the 1 to 9 in the D digit for counting purposes and generally only the last two, the E and F digits for actual information purposes.

When it comes to the actual information codes, such as the timing entries and the initial entries, then only the A digit is used for indexing purposes and the rest are all used for true information purposes.

Other entries interspersed with the three informational codes above, such as the hour entries contain actual information in only the last two or three digits and identification of the entry in the others or at least in the first four or three thereof.

The computer is prepared for operation by adjusting a plurality of set-up switches to express information concerning a tape to be processed. Such switches are here represented by the E and F set-up switches 1100 and 1101, respectively, and by means of such switches the following information may be established:

1. Sort of MU calls to be effected
2. Marker group—tens
3. Marker group—units
4. First recorder—tens
5. First recorder—units
6. Last recorder—tens
7. Last recorder—units
8. Day of round—first
9. Day of round—last
10. Month—tens
11. Month—units
12. Round All of this information with the exception of the first will be found in the tape identity codes and these codes must check by automatic circuit operation against the setting of the switches before operation of the device may proceed.

After the set-up switches are adjusted and the incoming tape has been introduced in the reader the tape end key is operated temporarily and then the start key is operated. It is necessary to operate the tape end key first because the ends of all output tapes must be prepared before the computer can go into operation and, therefore, the circuit is so arranged that until the tape end key has been operated and then restored the operation of the start key will be ineffective. Once the tape end key has been operated the operation becomes automatic and twenty-seven or some multiple thereof of the splice code will be perforated in all the output tapes. In accordance with certain arrangements which will be fully explained hereinafter, nine codes are spread over the output tapes and this is repeated three times. If the tape end key is restored before this operation is complete, then the operation will halt after each output tape has had twenty-seven splice codes perforated therein, otherwise the operation will be automatically repeated. Thereafter, the start key will be effective.

In the lower part of Fig. 11 the rectangle 1102 represents the entry spread progress circuit and consists of a sequence arrangement known as a walking circuit, whereby the ten MU perforators are operated in turn followed in order by the perforators for the straddle tape, the line observing tape, the MU detail tape, and the six detail tapes or any selection of these which may be determined by the nature of the incoming tape and recorded on the set-up switches. These various perforators, or rather means to sequentially render them operative to perforate a given code are here represented by the relays such as the MU0 relay 1103 at the left to the DET6 relay 1104 at the left.

The control of this entry spread progress circuit over the perforators is here shown schematically by the conductors such as the 0 conductor 1105 controlled by the MU0 relay 1103 and the 6 conductor 1106 controlled by the DET6 relay 1104 which may be effectively traced over the path 1107 through the day sort control 1300 and the perforator register 1301 to the perforator connector relays such as the P—0 relay 1302 and the P—18 relay 1303. Thus, the perforators such as the PERF.0 designated 1304 and the PERF.18 designated 1305 may be sequentially connected to the trunk for controlling the perforations to be made.

This trunk consisting of twenty-eight conductors extends from the line pattern connector 1108, through Fig. 12 and Fig. 13 to the twenty-eight relays A0 to F7 here shown as the perforator check circuit 1306.

The 081010 splice pattern code is formed in the line pattern connector 1108 employed for the end of tape preparation. In this rectangle, there is indicated the 081 relay 1109 which will extend grounds to the conductors of the perforator code trunk described so that each perforator as it is sequentially connected to this trunk will, as before stated, perforate a series of nine splice pattern codes, to be repeated three times.

It may now be assumed that the tape end key is restored and the start key is operated so that the device will go into operation. The splice code on the end of the incoming tape will be passed through the reader until the tape identity codes are encountered. These are nine codes 2891XX to 2899XX in order. The first of these must have the tape index 02, indicating that the incoming tape is one prepared in a second sort operation by the assembler. In the computer then the first code encountered after the splice pattern is 289102 and no other code will advance the operation of this device to further operations. It may also be noted at this point that no other accounting system device will accept this tape except the printer when set for verbatim printing.

The tape identity codes are then read by the reader, each in turn, and the information they carry is checked against the information expressed by the setting of the switches such as 1100 and 1101, also here generally indicated by the rectangle 500. Each of the codes 2891 to 2899, inclusive, will be expressed by the A, B, C and D digit reading relays and passed to the tape identity progress circuit 501 wherein a series of relays such as L1 relay 502 and L9 relay 503 will respond as each line is checked. As each line proves satisfactory a signal is given over the RS1 lead 504 to operate the RS1 reader step relay 700 to properly advance the tape in the reader to the next code. On the last line the reader step relay is not operated immediately but held until this information can be spread on the output tapes. When the full nine lines of the tape identity codes have been checked, and this will start the next operation by which the tape identification is spread on the prepared ends of each output tape, the complete nine lines on one tape and corresponding lines then repeated on the next tape under control of the entry spread progress circuit 1102. The TIE, tape identification ended relay 505 operates after all the tape identification codes have been perforated in all tapes.

The specific information for each line of tape identification is derived from the setting of the set-up switches such as 1100 and 1101 under control of the line pattern connector 1108 for the end of tape, such information being transmitted over the output trunk to the perforators such as 1304 and 1305.

The output tape ends having been prepared and a reader step relay having been operated, the first code of the time group having an item of general information is read. This is the recorder number in the form 280XTU where the D digit (X) is used to indicate that the recorder is a regular or an emergency unit and the E and F digits provide the tens and units digits of any recorder number from 00 to 19.

The A digit reading relays are shown here as exercising a control over the control circuits 506 and these in turn over the paths 507 and 600 as controlling the recorder register connector 701. If no recorder number has been registered then the RCRA relay 702 will be operated to register the D, E and F digits being read by the reader in appropriate parts of the recorder register 703. It may be noted at this time that where the recorder number code is encountered again at the beginning of another section of the incoming tape, the RCCA comparing relay 704 will be operated so that the recorder number may be compared with the number previously registered.

The next code is the hour code, 2811TU, and now the control circuits 506, over the path 601, cause the operation of the hour register connector 602 to register in the earlier hour register 900 this hour entry (generally 03). If this is as now assumed the first hour entry, then the H1A—B relay 604 is operated to register the hour as read. It may be noted that each subsequent hour entry, 2810TU, is through the H0A—B relay 603 whereby the value of the hour is reduced by 1 as it is transmitted to the earlier hour register 900.

The hour having been registered in the earlier hour register it is now transferred through the hour transfer check connector 901 to the current or disconnect hour register 902. This being the first hour entry such transfer takes place immediately. Where, under other circumstances, there is an existing registration in the disconnect hour register 902, then a check is made to see that the hour registered in the earlier hour register is one less in value than such existing registration and when this is proved the said existing registration is released and that in the earlier hour register 900 is transferred to the disconnect hour register 902.

The third and final item of general information is the calendar day code, in the form 2821TU, where T and U stand for the tens and units digits of the actual calendar day. Again the control circuits 506 over the path 601 operate the day register connector 605, and the registration is made in the day register 903. This is made in the decimal code, there being four tens relays representing the 0, 1, 2 and 3 for the tens digits of the calendar day and a full complement of ten units digits. When this registration is complete the computer is ready to proceed to its main duties.

It may be noted that the central office tape having been passed through the assembler twice, once on a units digit sort and once on a tens digit sort there may be as many as one hundred sections in the 289102 tape coming to the computer. These time group entries will follow the splice code in every case and, therefore, the processing of each section of a tape is preceded by the reading of these three, recorder, hour and day entries. During the processing of a tape section, there may be regular hour entries and these will adjust not only the hour registration but the day registration, for as the hour changes from 00 to 23, at midnight, the date also changes. This usually results in the diminution of the day by 1 but may entail a complete change, such as from 1 to 31, 30, 29 or 28.

The recorder, hour and day entries are not copied on any one of the output tapes but the registrations are held available to the line pattern connector whereby bits of information are gleaned from different sources to form the required output lines.

The computer acts as a sorting device to sort the various charges into different categories, such as message unit charges, toll charges, detailed records, line observing records and irregular records as well as discards. In addition, in single office marker groups the message unit calls may be further sorted by one digit of their directory numbers. Tapes from multioffice marker groups must be sorted by offices. Where the incoming tape from the assembler contains records for more than one day the detail records may be sorted in days. The controls for these different sorting operations are primarily responsive to the information in the initial entries and are further vested in the set-up switches and certain auxiliary circuits as will more fully appear hereinafter.

A regular message unit (MU) call record consists of three entries, the disconnect time, the answer time and the initial entry and it is not known that this is a message unit record until the initial entry is reached. However, the disconnect time and the answer time are registered and transmitted to the calculator and generally the elapsed time is calculated before the initial entry is registered. All three entries, however, must bear the same call identity index. This is registered upon the registration of the disconnect time and the index with each of the next two entries is compared with it.

Let us take as an example a call made by a subscriber at station SUmmit 6–5444, within the period covered by a record about to be processed. The initial entry for such a call, which happened to be made over a facility identified by the call identity index 27 would be 213027
035444 in which the message billing index (digit C of the first line) is assumed to be 3 and the office index (digit B of the second or first supplementary line) is 3 and which combined with the marker group would identify the office SUmmit 6.

Let it be assumed that the call was answered at 11.535 and the disconnect took place at 11.582. The answer timing entry would then be

153527 and the disconnect timing entry would be

158227

Now this call would have been assembled by the assembler and recorded in such manner that it would now be read by the computer in the form:

158227
153527
213027
035444

Therefore, the reader may now be assumed to read the first of these lines:

158227

The control circuits 506, over the path 600, cause the operation of the DTRA—B relay 705 in the timing entry register connector 706 so that the B, C and D digits thereof may be transmitted through the B, C and D sections of the disconnect time translator designated 1000, 1001 and 1002, respectively, whereupon the three digits 5, 8 and 2 are translated from the two-out-of-five code to the biquinary code, which is peculiarly well adapted for calculation. After translation these three digits are transmitted to the adder 1003 where they are registered in the TD (tens, disconnect), UD (units, disconnect) and PD (tenths, disconnect) adder relays.

At the same time the disconnect time is transmitted to the disconnect time register where a record of this data may be retained until it is certain that it is no longer needed. The arrangement of the disconnect time register 606 and the disconnect time translators 1000, 1001 and 1002 is such that while both are operated by the reader, the latter are then held operated by the register 606. In this sense, the register is needed until the call has been disposed of. However, the register 606 has a regular output which may not always be used. In a regular MU call it is not needed but in a detail call or an irregular call it will be needed. It is, therefore, registered in the disconnect time register until the processing of the data for this call is completed.

The E and F digits 2 and 7, respectively, of this first line of the entry constitute the call identity index and must be registered to identify later entries of this same call. Accordingly, when this line is read by the reader the control circuits 506, over the path 607, cause the operation of the DJR2 relay 608 whereby the E and F readings of the code are transmitted over path 609 to the call identity index register and decimal translator 800. The call identity index is, therefore, retained for reference purposes and for comparison with the call identity index readings of the succeeding entries of this call.

When the disconnect time register 606 upcheck circuit and the call identity index register 800 up-check circuits are closed showing a proper registration of this entry, the RSI reader step relay 700 (circuits not indicated) is operated and the reader is advanced to read the next entry, the answer time.

The answer time line

153527 is now read by the reader. The control circuits 506, over path 600 now cause the operation of the ATRA—B relay 707 whereby the B, C and D digits 535 of this line are transmitted to the B, C and D answer time translators 1004, 1005 and 1006, respectively, for transmission on a biquinary basis to the TA, UA and PA relays of the adder 1003.

As soon as the adder up-check circuits report a satisfactory registration the elapsed time will be calculated. The method of calculating is to express the addend in its natural form, the augend as its nine's complement, to add in a "one" in the lowest denominational order and to ignore, or throw away the "carry one" out of the highest denominational order. Thus, where the disconnect time is 58.2 and the answer time is 53.5 the elapsed time is 4.7 and this is arrived at by adding

```
 582
 464
   1
----
1047
``` wherein the left-hand 1 is discarded so that the result becomes 047.

There are, however, other considerations in calculating the elapsed time and hence the value calculated in the tens order is carried through the hour tens adder 1008 so that 6 (for 60 minutes) or some multiple thereof may be added if there have been one or more hour entries between the disconnect entry and the answer time entry. In the present case we assume there have been no such entries and hence the value 0 is transmitted through the hour tens adder 1008 without change, and the three digits 047 are brought into the elapsed time round-off translator 1307, each to its corresponding denominational order. In actual practice, a small time allowance to cover traffic delay in establishing a connection after the called party has answered and delay in recording the disconnect signal is made and then the call is rounded off to the next higher minute. The details of these operations carried out in the elapsed time round-off translator 1307 are described in detail hereinafter. The output of these translators is chargeable time and as such will be used as described hereinafter. The carry-out from the tens translator goes into the control circuits (not shown) for purposes to be described. The carry-out 0 will indicate a negative result while the carry-out 1 will indicate a normal positive result and will constitute a signal to advance the operations.

As in the case of the disconnect time, the answer time also is registered in the answer time register 708. When the answer time up-check circuit is closed the AUC relay 709 is operated providing the call identity index also checks and the RSI reader step relay is also operated to advance the reader to the first line of the initial entry.

Upon the operation of the ATRA—B answer time register connector relay 707, a ground is extended directly to the JCT—JCU call index check connector relay 610 whereby the E and F digits of the answer time line (constituting the call identity index) are extended for comparison with the call identity index already registered in the call identity index register and decimal translator 800. If the comparison of these numbers proves them to be identical then a check circuit combined with the up-check circuit for the answer time register 708 will cause the operation of the reader step control to advance the tape in the reader so that the first line of the initial entry may be read.

The first line of the initial entry is now read by the reader. The A digit is 2 and since this has been assumed to be an MU record the B digit is 1. The B digit in the first line of each initial entry indicates the general character, message unit, detail or line observing and will cause the operation of a corresponding relay in the input class register 509 which is of prime importance in the later operation of the output class register 1111. In this case the control circuits 506 over the path 607 operate the CLRA—B relay 611. The value in the C digit is transmitted to the billing index register 801 and the call index check connector 612 is operated as before to check the call identity index in the register 800.

The reader line count circuit 508 may actually be considered part of the control circuits 506 and is shown as being operated from the same source and as having a control over these control circuits. It functions to keep a count of the lines of code read for each group of lines constituting the charge data for each call. It is a steering means and is shown as providing a path for the connector relays for the supplementary lines of the initial entry.

Thus, on the first supplementary line of the initial entry which follows the proper entry of the first line and the successful comparison of the call identity index, the reader line count circuit 508 will cause the operation of the NRA—B—C calling number connector relay 613. Thereupon, the B, C, D, E and F digits of this supplementary line will be transferred to and registered in the calling number register and decimal translator 802, so that the output line or lines are now ready to be perforated if everything has been regular.

The B, C and F digits have output paths leading through the sort class connector 1110 to control the sorting of the call in accordance with predetermined conditions, particularly as recorded on the set-up switches.

Meanwhile, during the reading of the lines of the initial entry the computation of the elapsed time has taken place, so that during the registration of the last supplementary line the output is prepared. Assuming everything to be regular and the chargeable time to indicate nine or less message units, then the charge data becomes a single line transmitted to the particular output perforator selected by the sort class connector 1110 and the value of the digit registered in the calling number register 802. Under control of the output class register the DN directory number pattern forming relay 1200 will be operated to control the pattern of the output.

The number of message units is calculated from the computed chargeable time. The output of the elapsed time round-off translator 1307 is transmitted through the message units formula circuit 1201, under control of its connector 1202 and the calculated message units are registered in the message units register 1203. It may be noted that the chargeable time is in some cases also transmitted through the chargeable time translator 1204 and registered in the chargeable time register 1205 where it is available where details are wanted. In the case under assumption it is not needed and will not be used. However, the number of message units calculated and which have been assumed to be capable of being expressed in one digit are available over the F path coming out of the message units register 1203 and are transmitted by the BK1—A relay 1112 in the output class register 1111 to the B group of contacts of the DN relay 1200 so that the B digit of the output line will contain the computed charge in message units.

The calling line number is transmitted from the C, D, E and F parts of the calling number register 802 to the C, D, E and F contacts of the DN relay 1200 so that these digits of the output line will contain this calling line number.

The A digit of the output line is formed through the operation of one of the relays in the output class register 1111, such as the BK1—B relay 1113 so that this is recorded as 1.

Had the number of message units calculated been ten or over and, therefore, been capable of expression only in two decimal digits, then the output becomes a two-line entry with the DN pattern relay 1200 operated for the first and the TMU relay 1206 operated for the second line. In this case, the A digit of the first of these lines is recorded as 2 under control of the BK2—B relay 1114, and the B digit is recorded as 0 under control of the same relay (path not shown). The C, D, E and F digits are derived as before from the calling number register 802.

The second line is formed by the TMU relay 1206. The A and B digits both become 0 under control of one of the relays in the output class register such as the BK2—B relay 1114. The computer connector and control circuit 805 may be set to operate through the call type translator 907 to change the record in the B digit through the TMU relay 1206 from 0 to a 1 or 2.

The C and D digits are invariably zeros in this line under control of the DAB relay 1115.

The E and F digits are supplied by the output of the message units register 1203.

As each output line is perforated the perforator check circuit 1306 reports the progress of the operations to the perforator control circuits 1309 and after a complete set of charge data lines have been perforated on a selected output tape the individual and specific operating units are released and made ready for another call. Items of general information, such as the hour and the day are retained since this information is common to all the calls within a given section of tape. In actual service there is an overlap operation of elements of the device, consisting of the release of the disconnect and answer registers as soon as it is determined that sufficient information has been stored for the perforation of an output tape. Thus, the disconnect and answer registers may be cleared before the computer has completed its task and the disconnect time and the answer time for the next call may be in process of being registered and may even be completely registered before the remainder of the device is released.

It is not necessary to describe in detail the complete operation in other types of calls. All calls or groups of items of information representing the data for each customer charge consists of three items, a disconnect time, an answer time and an initial entry. In each case the two timing entries are entered first so that they may be placed in the adder at the earliest possible moment so that the computation of the elapsed time may be made as the remaining information is being entered. The simplest case has been described in which certain of the apparatus provided has not been used. In the more complex cases such as the toll or detail call the area and called office register 803 and the called number register 804 are called into use to store information contained in the initial entry and from which information is gleaned by the pattern relays of Figs. 12 and 13 for forming the output lines.

One of the important items on all calls in which the details of the charge are reported is the start time line. This is a line coded from six digits of the day, hour and minutes at which the call is started, generally speaking, the answer time. The tens and units digits of the calendar day are taken from the day register 903, passed through the connector 804 to the day register translator 905 from which the tens digit is passed to the start time line register 906 for combination with the minutes tens digit from the answer time tens translator 1004 to form the B digit of the start time line. In a similar manner, the hour tens digit is taken from the disconnect hour register 902, passed through the start time line register connector 908 and combined in the start time line register with the minutes tens digit from translator 1004 to form the C digit of the start time line. The B and C digits thus formed are transmitted to contacts of the TM pattern relay 1308 for use as required. The D digit of the start time line is the units day digit and, therefore, is the F digit coming out of the day register translator 905. The E digit of the start time line is the units hour digit and, therefore, is the units digit taken from the current or disconnect hour register 902, passed through the start time line register connector 908 and registered in the time pattern register 909. The F digit of the start time line is the units digit of the minutes and comes from the units section of the answer time register 708 and is passed through the start time line register connector 908 and registered in the time pattern register 909.

Thus, the main elements of the computer and their cooperative relationship to each other have been briefly noted and may be summarized as follows: The computer consists of a reader for reading off items of information from an incoming tape, a plurality of registers and translators for storing the information, a calculator for computing charges, a pattern circuit for supervising the lines of a computed charge and a plurality of perforators, selectively taken into service for recording the computed charges under control of the reader.

Supplementary to these regularly employed elements is the straddle circuit which has supervisory functions and acts to keep a constant watch on the operations of the computer so that if there is any deviation from regularity the control is seized and the call is then disposed of under direct control of this circuit. Certain calls such as don't answer and busy calls are discarded and others are recorded on a straddle tape where full details may be spread before a clerk for proper disposition. The important element in this circuit is the entry progress register which has a connection from each of the registers to report the proper operation thereof. Herein is shown, by way of example, the path 614 leading from the disconnect time register 606 to the entry progress register 510 to report the proper entry of the disconnect time. Should the disconnect time fail of registration and the other elements of the call be properly registered then the entry progress register would report a call with only one timing entry and if this were at a leading tape end the straddle input register 511 would be operated, in turn operating the straddle output register so that details of the call would be reported on the straddle tape. There are numerous circumstances by which the straddle circuit takes charge of the output circuit, dealing with numerous causes of irregular calls, all of which are more fully described in the said Joel application.

*The characteristic feature of the invention*

The characteristic feature of the present invention is a control circuit involving a pair of relays used under a number of different conditions to control the circuit of the computer whenever there is a change in the recorder number and to establish a signal for the straddle circuit so that the change may be noted and if it occurs during the processing of a call the output may be diverted to the straddle circuit for special attention.

Let us assume as a first example of the operation of this circuit that a recorder number is missing. In practice an incoming tape which has been produced by the assembler circuit will be in a large plurality of sections (up to 100 sections), each section of which has recorded therein first the tape identity information, then the recorder, hour and day notations and after that the specific items of the customer charges. It is necessary to register certain general items of information such as the recorder number, the end of tape hour and the calendar day before any specific items of information are read and it is necessary that these items be properly registered in order to enable the computer as a whole. Therefore, a check circuit is provided so that if any one of these items is missing an alarm will be brought in.

The recorder number is a code 280XXX, the end of tape hour is a code 2811XX and the day is a code 282XXX and these three codes must follow each other in regular order. Therefore, if after the tape identity information has been read the code 2811XX is encountered it will result in bringing in an alarm because the 280XXX code has not been received. This is brought about as follows:

The reader is indicated in the rectangle 1500 and at present we are only interested in the two contacts G1 and G2 which make on alternate lines of the code being read. With everything in order when the G1 contact is made the RKA and RKB relays of the reader step check circuit 1501 are released so that ground is extended to the conductor 1502 and thence through the reader connector relay 1503. Also if the contact G2 is closed then the RKA and RKB relays of the reader step check circuit 1501 will be operated and the ground will be extended in the same manner to the conductor 1502 and thence through the contacts of the RCD reader connector relay 1503. This ground is then extended through the armature and back contact of the alarm relay 1504 and thence through the validity circuit consisting of an armature and contact network for each of the B, C, D, E and F reading relay groups which is closed when and only when two relays of each group are properly operated so that under normal conditions ground is extended to the conductor 1505. This ground then extends through the armature and back contact of the GT4 gate relay 1506, the armature and front contact of the TIE tape identification ended relay 1507, the armature and back contact of the MTID relay 1508, the armature and back contact of the L4B relay 1509, thence through a network of the armatures and contacts of the A digit reading relays now operated to express the digit 2 (the A digit of any one of the recorder, hour or day codes), through the armature and back contact of the GT2 gate relay 1510, thence through a network of armatures and contacts of the B reading relays to express the digit 8, the C relays to express the digit 1 and the D reading relays to express the digit 1 to the 2811 conductor leading through armature 2 and back contact of the RCR relay 1600 to the winding of the RCM recorder number missing relay 1511. Therefore, if the code 2811XX appears without the 280 code having been received the RCM relay will be operated. It may be noted that if the 280 code had been properly received then the RCR relay 1600 would have been operated so that the winding of the RCM relay would have been open. As the 2811XX code is received and the RCM relay operated, the reader cannot be advanced, that is, there is no circuit for any one of the reader step relays such as the RS2 relay 1601. Therefore, the reader repeatedly reads this 2811XX code and as a result of its not stepping forward or performing any other useful function will in time operate the TM time relay and bring in an alarm, stopping the operation of the machine.

The RCM relay, however, becomes operated and establishes a circuit from ground, armature 1 and front contact of the ST4B relay 1602, the armature and front contact of the RCM relay 1511 to the winding of the C relay 1603 to operate this relay in order to bring in the straddle circuit and divert the output of any call which might be in process at this time to the straddle tape. As the C relay 1603 operates a circuit is established from the MONA master off-normal relay 1604 through the recorder release key 1605, the armature 1 and back contact of the RRR relay 1606, the armature 2 and front contact of the STA4B relay 1602, armature 4 and front contact of the C relay 1603 to hold this relay locked until the machine is entirely released.

Upon the operation of the C relay a ground will be extended from the armature 2 and front contact thereof, thence through an armature and back contact of any one of the NCC, NCT, NCU1 or NCU2 relays to cause the operation of the RC relay 1607. It may be noted at this time that if the SDC straddle down-check relay 1608 is operated to indicate that the straddle circuit is completely released, then, upon the operation of the RC relay 1607 a ground is extended from armature 2 and front contact of the SDC relay 1608, the armature 4 and front contact of the RC relay 1607 and thence through a chain circuit of relays in the output start circuit 1609 and the entry progress register 1610, the front contact and armature 1 of the SDC relay 1608 to the winding of the PE relay 1611. Therefore, both the RC relay 1607 and the PE relay 1611 have operated at this time. The PE relay locks through its armature 2 and front contact directly to the ground supplied by the SDC relay 1608.

If, on the other hand, the operation of the RC relay 1607 occurs after one or more timing entries have been registered or at some place where a recorder number change would affect the calculation or the validity of the customer charge, then the SDC straddle down-check relay will be found released and the circuit for the PE relay cannot as yet be established. At this time then the C relay, as fully explained in the said Joel application, will control means to divert the output of the call in process to the straddle output tape. When this operation has been completed and there is thus no further function for the computer to perform, such as in this case to perforate output lines on the straddle tape, the straddle circuit will indicate normal, the SDC relay will operate, the PE relay will follow as above described and the computer will time out.

The machine having come to a stop on account of the operation of the alarm relay 1504 a ground will be extended by the MONA relay 1604 through the armature and back contact of the ST3 relay 1612, thence over the front contact and armature of the AL relay 1504, the armature 2 and front contact of the RCM relay 1511 to light the recorder release alarm lamp 1512.

The attendant noting this lamp operated will then operate both the machine release key (not shown here) and the recorder release key 1605 to release the start relays such as the ST4B relay 1602 and the ST3 relay 1612. The operation of the recorder release relay 1605 will remove the ground from the armatures of the RRL relay 1613 and thereby release any one of the recorder register relays which may be operated at this time so that the recorder register now becomes fully released and its down-check circuit becomes closed.

Also upon the operation of the recorder release relay 1605 the holding ground for the C relay 1603 is opened at the armature 2 and front contact of the ST4B relay 1602 and this relay releases, in turn releasing the RC relay 1607. However, the PE relay 1611 remains locked directly to the front contact of the SDC relay 1608.

Now, as the operator releases the recorder release key 1605 a ground is extended from the MONA relay 1604 through this relay, through the armature 5 and back contact of the RCCA—B relay 1700, the armature 1 and back contact of the RCRA—B relay 1701, thence in a down-check chain circuit controlled by the recorder register units relays such as the RUC9 relay 1702 to the CK1 conductor 1703, the back contact and armature 20 of the RCRA—B relay 1701, the DC conductor 1704, thence in a chain circuit through the armatures and back contacts of the recorder register tens relays such as the RCT4 relay 1705 and the recorder register type of recorder relays such as the RC6 emergency recorder relay 1706 to the upper winding of the RDC recorder register down-check relay 1614. Thus, the recorder register has been emptied and its down-check relay 1614 has been operated so that the device is now ready for the insertion of a fictitious recorder number.

The operator now operates the register reset key 1615. A ground is extended from armature 2 and front contact of the MONA relay 1604, through the armature and back contact of the now released ST3 relay 1612 to both spring combinations of the register reset key 1615. Over the top combination this ground is extended through the armature 2 and front contact of the RDC register down-check relay 1614, the front contact and armature 3 and the armature 4 and front contact of this relay through the armature 1 and back contact of the C relay 1603, thence over the armature 1 and front contact of the PE relay 1611, the back contact and armature 2 of the RC relay 1607 to cause the operation of the RCRA—B register connector relay 1701. At the same time the ground is extended through the lower pair of springs of the register reset relay 1615, thence over the armature 10 and front contact of the RCRA—B relay 1701 to the RCT4 lead to cause the operation of the RCT4 relay 1705 which thereupon locks through its front contact and armature 2 to the ground supplied over the back contact and armature 2 of the RRL relay 1713. The operation of the RCT4 relay 1707 opens the down-check circuit of the recorder register and thus opens the circuit of the upper winding of the RDC relay 1614 but this relay remains locked until the recorder reset key 1615 is released. When the operator thus releases the recorder reset key, the RDC relay 1614 returns to normal with a fictitious number represented by the operation of the RCT4 relay 1705 stored in the recorder register. The RCT4 relay carries contacts (not shown here) for causing the recorder number 20 to be recorded in any output tape, if such recorder number should be called for during the continued operation of this relay. The circuit is now in condition for advancing the operation of the computer. The RCR relay 1600 has been operated through the armature 3 and front contact of the RCRA—B relay 1701 and has locked through its front contact and armature 3 and the back contacts of certain relays in the day register control relay 1616 to a front contact of the MONA relay 1604. This ground is also extended over the armature 4 and front contact of the RCR relay 1600 to the winding of the RCM relay 1511 separated by a resistance from the source of battery so that even though the other terminal of this relay should be grounded the relay will not respond.

The operator may now start the device since it is in a condition to read and record the end of tape hour code 2811XX. Therefore, when the reader again reads this code and the 2811 lead from the D reading relays is grounded, the normal operations with which we are not at present concerned will take place.

The PE relay 1611 remains operated now until the first call has been entered. If this call is regular in all respects then the PE relay will be released. The SDC relay 1608 will release and remove a ground from the locking circuit of the PE relay after the call has been regularly entered and the first output line of a previously registered call has been counted, leaving this locking circuit under control of the SLKA relay. The SLKA relay 1621 (the straddle lock control relay) also removes ground from this circuit if the straddle circuit has been in use and has now returned to normal. Generally, the PE relay is released after the first call processed after its operation has been completely registered and thereafter remains released through a long succession of calls until there is another indication of a recorder number change.

Generally, it may also be said that the RC relay guards the device to throw a partial call into the straddle circuit before a recorder number change occurs and the PE performs a like function for a limited time after such a change occurs.

Another instance in which the RDC and PE relays operate to forward the operations of the device are when a recorder code is received in regular order. In this case, the recorder code 280XXX will place a ground on the 280 lead connected to the armatures 3, 4 and 5 of the RDC relay 1614. This ground will be extended through armature 5 and back contact of the RDC relay 1614 to the winding of the RCCA—B relay 1700 in order to operate this recorder comparing connector relay so that the code now being read may be compared with a code which is already recorded in the recorder register. Let us assume that this code is 280513. The digit 5 in the D denominational place means that this is a regular recorder and not an emergency recorder. Let us further assume that this code carries information exactly the same as that having been previously registered in this register. Therefore, the RC5 relay 1707 will be operated and since the D digit expresses the number 5, then the RC5C lead will be grounded through armature 10 and front contact of the RCCA—B relay 1700 and this ground will be extended over armature 5 and front contact of the RC5 relay 1707 to the NCC relay 1616, thus establishing the fact that there has been no change in the recorder transfer indication. In much the same manner the NCT no change in recorder number tens relay 1617 will be operated and again in much the same manner the NCU1 and NCU2 no change in recorder number units relays 1618 and 1619 will be operated. With all four of these relays operated to indicate that there is no change in the recorder number or that no change is to be made in the number registered in the recorder number register, a ground will be extended serially through the contacts and armatures of these relays, the armature 3 and back contact of the C relay 1603 to operate the RS2 relay 1601 and thus the reader will be advanced in normal manner.

If, on the other hand, there appears to be a change in either the D, E or F digit then some one or more of the no change relays will be operated. Also the C relay 1603 will be operated as a result of this change. Let us assume, for example, that the number registered is 513 and that the number now being read is 613. Therefore, the ground on the number 6 lead from the D reading relays will be extended by armature 11 and front contact of the RCCA—B relay 1700 over the RC6C lead, thence over armature 6 and front contact of the RC5 relay 1707 which had previously been operated and locked, over the armature 2 and back contact of the RRR relay 1606 to cause the operation of the C relay 1603. The C relay now operates and through its armature 2 and front contact extends a ground through an armature and back contact of some one of the no change relays, in this case the NCC relay 1616 to cause the operation of the RC relay 1607. The RC relay closing a circuit through its armature 4 and front contact will cause the operation of the PE relay 1611 as hereinbefore described, either immediately if the occurrence is at an opportune time between calls or later after the straddle circuit has performed its function if the occurrence is within a call. As soon, however, as the C relay 1603 has caused the operation of the RC relay 1607 as hereinbefore described and while both the RC relay 1607 and the PE relay 1611 are operated, a ground originating in the output start circuit 1609 through the STLB relay is extended through the entry progress register 1610, the front contact and upper armature of the PE relay 1611, the front contact and armature 1 of the RC relay 1607 to cause the operation of the RRR relay 1606 which opens both the original energizing circuit and the holding circuit of the C relay 1603 and allows this relay to release. However, before the release of the C relay can take place, the RRL relay 1613 becomes operated in series therewith, the circuit being traced from ground, armature 1 and front contact of the MONA relay 1604, the recorder release key 1605, the armature 1 and back contact of the RDC relay 1614, the winding of the RRL relay 1613 to the other terminal thereof which is now freed from ground through the operation of the RRR relay 1606, thence over armature 2 and front contact of the ST4B relay 1602 to the holding circuit for the C relay 1603. The operation of the RRL relay 1613 now opens all the holding circuits for the release of the recorder register and this circuit returns to normal, thus closing the down-check circuit hereinbefore traced and causing the operation of the RDC relay 1614 over its upper winding. The RDC relay locks to the 280 conductor and remains thus locked until the end of the reading cycle. The operation of the RDC relay opens the circuit of the RRL relay 1613 and the C relay 1603 and these relays both release. The RC relay also holds in a circuit from the 280 conductor, over armature 4 and front contact of the RDC relay 1614, the armature 1 and back contact of the C relay 1603, the armature 3 and front contact of the ST4B relay 1602 to the holding circuit of the RC relay 1607.

At the end of the reading cycle the RC relay releases but the RDC relay 1614 remains operated through its upper winding.

On the next reading cycle after a straddle has been properly disposed of, the same code is again read by the reader and the recorder register now being released the 280 ground will be extended over the armature 4 and front contact of the RDC relay 1614, the armature 1 and back contact of the C relay 1603, the armature 1 and front contact of the PE relay 1611, the back contact and armature 2 of the RC relay 1607 to cause the operation of the RCRA—B relay 1701 and within this cycle the codes from the D, E and F reading relays will cause the operation of the register relays in this recorder register. Since no register relays are operated at this time no one of the no change relays will be operated. However, when some pair of the units relays such as the RCU0 relay 1702 is operated, then a ground will be extended to the RS2 conductor to cause the RS2 relay 1601 to be operated to step the tape in the reader along. Let us say, by way of example, that the RCU1 relay 1708 and the RCU2 relay 1709 to express the digit 3 have been operated. Ground is extended from armature 1 and front contact of the MONA relay 1604, through the recorder release key 1605, the armature 5 and back contact of the RCCA—B relay 1700, through the up-check circuit of the RC5 and RC6 relays, thence through the up-check circuit of the RCT0 and RCT1 relays to conductor 1710, thence through the up-check circuit of the units relays including the armature and back contact of the RCU0 relay 1702, the armature 6 and front contact of the RCU1 relay 1708, the armature 4 and front contact of the RCU2 relay 1709, the front contact and armature 2 of this same relay to the U2C lead, thence over armature 17 and front contact of the RCRA—B relay 1701 to the DE lead, armature 7 and back contact of the RCU4 relay 1711, armature 5 and back contact of the RCU7 relay 1712 to the CK1 conductor 1703 and thence over the front contact and armature 19 of the RCRA—B relay 1701 to the U72 conductor connected in parallel to an armature of each of the units relays so that through the operation of either the RCU1 relay 1708 or the RCU2 relay 1709 this ground is extended to the RS2 conductor to operate the RS2 relay as above stated.

Thus, it will be seen that whenever a recorder number different from that recorded (including nothing recorded) is encountered, the RC recorder change signal is operated and that it in turn eventually causes the operation of the PE preliminary straddle indication relay, the RC holding until the end of the reading interval. During the ensuing free interval the RC relay releases and with the RC relay down and the PE relay up when the code is repeated on the second reading interval the new number will be placed in the recorder register and the PE relay will remain operated. The PE relay is a preliminary signal and is used to alert the straddle circuit. The PE relay will thus remain operated throughout the complete processing of a call during which it was operated or immeditely prior to which it was operated so as to be ready to call in the straddle circuit should another change in recorder take place during the processing of such call. At the end of this processing the PE relay is released by means not shown but indicated by the broken line leading to the front contact of armature 2 thereof. Thereafter, whenever a recorder change occurs the operations hereinabove described take place. If the preliminary signal relay is operated and if the recorder change takes place after the reading of the first timing entry and before the reading of the last line of an initial entry, then the call will be diverted to the straddle circuit and a record of the operations recorded therein.

What is claimed is:

1. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, one of said registers being provided for registering an item of general information which does not enter into the calculation of a customer charge except when there is a change in the said item during the period over which the data for a said charge is gathered, a supervisory circuit for diverting information from a normal channel to one of said output tapes to a special output tape, a preliminary signal means, a registration changed means, means responsive to a reading by said reader of an item of general information destined for registration in said one of said registers when said one of said registers is idle, or alternatively when said item of general information differs from an item already registered in said one of said registers for operating said registration changed means, said preliminary signal means being thereafter responsive to said registration changed means, means responsive to the complete registration of the specific items of information comprising the data for a customer charge, means jointly responsive to the reading of an item of general information destined for registration in said one of said registers differing from the said item at that time registered in said one of said registers and to said operated preliminary signal means for enabling said supervisory circuit, a calculator for calculating customer charges from said registered information, a plurality of recorders for recording customer charges derived from said registered information, sorting means responsive to said registered information for selecting one of said recorders for each said derived customer charge and a plurality of pattern forming means for deriving from said registered information the information necessary for each output item of information to be recorded by said selected recorder.

2. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, one of said registers being provided for registering an item of general information which does not enter into the calculation of a customer charge except when there is a change in the said item during the period over which the data for a said charge is gathered, a supervisory circuit for diverting information from a normal channel to one of said output tapes to a special output tape, a preliminary signal means, a registration changed means, means responsive to a reading by said reader of an item of general information destined for registration in said one of said registers when said one of said registers is idle, or alternatively when said item of general information differs from an item already registered in said one of said registers for operating said registration changed means, said preliminary signal means being thereafter responsive to said registration changed means, means responsive to the complete registration of the specific items of information comprising the data for a customer charge, means jointly responsive to the reading of an item of general information destined for registration in said one of said registers differing from the said item at that time registered in said one of said registers and to said operated preliminary signal means for enabling said supervisory circuit, a calculator for calculating customer charges from said registered information, a plurality of recorders for recording customer charges derived from said registered information, sorting means responsive to said registered information for selecting one of said recorders for each said derived customer charge, a plurality of pattern forming means for deriving from said registered information the information necessary for each output item of information to be recorded by said selected recorder, and means responsive to the said enabling of said supervisory circuit for operating one of said pattern forming means for reporting on said special output tape items of information setting forth the change in the said item of general information.

3. In an automatic accounting system in which customer charges for uses of given facilities are derived from scattered items of specific and general information recorded on continuous tapes during and by the said customer uses of the given facilities and wherein the conversion of said data into customer bills is accomplished in a series of steps by a plurality of accounting devices each of which is adapted to read items of information from an incoming tape and to assemble, sort, translate, compute or otherwise rearrange said items and to record the results on a plurality of outgoing tapes, one of said devices consisting of a computer for transforming groups of assembled items of information into customer charges and to issue said charges in billable form, said computer comprising a reader for reading codes from an incoming tape, a plurality of registers for registering information read by said reader and information derived therefrom, one of said registers being provided for registering an item of general information which does not enter into the calculation of a customer charge except when there is a change in the said item during the period over which the data for a said charge is gathered, a supervisory circuit for diverting information from a normal channel to one of said output tapes to a special output tape, a preliminary signal means, a registration changed means, means responsive to a reading by said reader of an item of general information destined for registration in said one of said registers when said one of said registers is idle, or alternatively when said item of general information differs from an item already registered in said one of said registers for operating said registration changed means, manually controlled means for entering a fictitious item of information into said one of said registers when the said register is idle, said registration changed means being also responsive to said manually controlled means, said preliminary signal means being thereafter responsive to said registration changed means, means responsive to the complete registration of the specific items of information comprising the data for a customer charge, means jointly responsive to the reading of an item of general information destined for registration in said one of said registers differing from the said item at that time registered in said one of said registers and to said operated preliminary signal means for enabling said supervisory circuit, a calculator for calculating customer charges from said registered information, a plurality of recorders for recording customer charges derived from said registered in formation, sorting means responsive to said registered information for selecting one of said recorders for each said derived customer charge and a plurality of pattern forming means for deriving from said registered information the information necessary for each output item of information to be recorded by said selected recorder.

ALFRED E. HAGUE.
AMOS E. JOEL, Jr.

No references cited.